United States Patent
Kotani et al.

(10) Patent No.: US 7,221,102 B2
(45) Date of Patent: May 22, 2007

(54) HIGH-FREQUENCY POWER SUPPLY DEVICE

(75) Inventors: Hiroyuki Kotani, Osaka (JP); Hirotaka Takei, Osaka (JP); Hiroyuki Ito, Osaka (JP); Tatsuya Ikenari, Osaka (JP); Yoshiki Fukumoto, Osaka (JP)

(73) Assignee: Daihen Corporation, Osaka (JP)

( * ) Notice: Subject to any disclaimer, the term of this patent is extended or adjusted under 35 U.S.C. 154(b) by 384 days.

(21) Appl. No.: 10/772,934

(22) Filed: Feb. 5, 2004

(65) Prior Publication Data
US 2005/0259450 A1 Nov. 24, 2005

(30) Foreign Application Priority Data
Feb. 7, 2003 (JP) ............................. 2003-031406
Apr. 16, 2003 (JP) ............................. 2003-111222

(51) Int. Cl.
*H05B 41/16* (2006.01)
(52) U.S. Cl. .................. 315/248; 315/246; 323/222; 323/283; 369/44
(58) Field of Classification Search ........ 323/282–288, 323/222, 907, 283; 330/250, 269, 272, 289, 330/254, 256; 315/111.41, 111.21, 111.51, 315/248, 246; 369/44, 27, 29
See application file for complete search history.

(56) References Cited
U.S. PATENT DOCUMENTS
5,543,689 A * 8/1996 Ohta et al. .............. 315/111.21

FOREIGN PATENT DOCUMENTS

| JP | 61-016314 | 1/1986 |
|----|-----------|--------|
| JP | 11-233294 | 8/1999 |
| JP | 2001-035699 | 2/2001 |
| JP | 2001-197749 | 7/2001 |
| JP | 2001-244754 | 9/2001 |

* cited by examiner

*Primary Examiner*—Rajnikant B. Patel
(74) *Attorney, Agent, or Firm*—Hamre, Schumann, Mueller & Larson, P.C.

(57) ABSTRACT

The invention relates to a HF power supply device including an oscillator (11) outputting a HF signal, an amplifier (12) amplifying the output of the oscillator for supplying a HF output to a load, and a DC power supply (13) to supply a DC power voltage to the amplifier (11). The power supply device further includes a loss calculator (18) calculating a loss in the amplifier (11), a first controller (19) controlling the output of the power supply (13) and a second controller (20) controlling the output of the oscillator (11) or amplifier (12). When the calculated loss by the calculator (18) exceeds a predetermined loss set value, the first controller (19) lowers the output power voltage of the power supply (13) to make the calculated loss equal to the loss set value. When the calculated loss is no greater than the loss set value, the first controller (19) maintains the output power voltage at an appropriate DC voltage set value, while the second controller (20) controls the output of the oscillator (11) or amplifier (12) so that the HF output to the load from the amplifier (13) approaches a HF output set value.

15 Claims, 19 Drawing Sheets

Vdc ··· Output Voltage of DC Power Supply
Vdcset ··· Vdc Set Voltage
VLset ··· Vdc Lower Limit Set Voltage
Ploss ··· Calculated Loss
Plset1 ··· First Loss Set Value
Vdc1 ··· Normal Output Voltage Set Value (Initial Value) of DC Power Supply
$\Delta V$ ··· Fixed Small Voltage Set Value Pfset ··· Forward Power Set Value
Pf1 ··· Forward Power Set Input
Pf ··· Forward Power Output Value
Vdc ··· Output Voltage of DC Power Supply
VLset ··· Vdc Lower Limit Set Voltage
Ploss ··· Calculated Loss
Plset2 ··· Second Loss Set Value
△P ··· Fixed Small Power Set Value Vdc ⋯ Output Voltage of DC Power Supply
Vdcset ⋯ Vdc Set Voltage
VLset ⋯ Vdc Lower Limit Set Voltage
Tj ⋯ Calculated Junction Temperature
Tj1set ⋯ First Junction Temperature Set Value
Vdc1 ⋯ Normal Output Voltage Set Value (Initial Value) of DC Power Supply
$\Delta V$ ⋯ Fixed Small Voltage Set Value Pfset ··· Forward Power Set Value
Pf1 ··· Forward Power Set Input
Pf ··· Forward Power Output Value
Vdc ··· Output Voltage of DC Power Supply
VLset ··· Vdc Lower Limit Set Voltage
Tj ··· Calculated Junction Temperature
Tj2set ··· Second Junction Temperature Set Value
$\Delta P$ ··· Fixed Small Power Set Value

HIGH-FREQUENCY POWER SUPPLY DEVICE

BACKGROUND OF THE INVENTION

1. Field of the Invention

The present invention relates to a high-frequency power supply device which supplies high-frequency power to a load, and more particularly relates to a high-frequency power supply device which is suitable for use as a power supply in plasma generating apparatus, laser oscillators and the like.

2. Description of the Related Art

As shown in FIG. 22, high-frequency power supply devices which are used as power supplies in plasma generating apparatus, laser oscillators and the like are basically constructed from an oscillator to output a high-frequency signal of a specified frequency, an amplifier which amplifies the output of the oscillator, a direct-current power supply 3 which supplies a direct-current power voltage Vdc to the amplifier 2, a high-frequency output detector 4 which detects the high-frequency output that is output by the amplifier 2, and a controller 5 which controls the high-frequency output that is detected by the high-frequency output detector 4 so that this output is maintained at a high-frequency output set value Pfset. The output of the amplifier 2 is supplied to a load 6.

The oscillator 1 is constructed from an oscillator which generates a high-frequency signal that has a specified frequency, and an amplifier which amplifies the output of this oscillator (if necessary). The amplifier 2 is constructed from a power amplifier 2a.

The controller 5 inputs the high-frequency output set value Pfset and the high-frequency output Pfdet that is detected by the high-frequency output detector 4, and controls the output voltage Vdc of the direct-current power supply 3, the output of the oscillator 1 and the gain of the amplifier 2 so that the high-frequency output Pfout that is supplied to the load 6 from the amplifier 2 is maintained at a value that is equal to the high-frequency output set value Pfset.

In such a high-frequency power supply device, when the matching of the output impedance of the high-frequency power supply device and the load impedance is lost as a result of fluctuations in the load, an excessively large reflected power flows into the amplifier 102 from the side of the load 6, so that there is a danger of damage. Conventionally, therefore, a method has been used (as indicated for example in Japanese Patent Publication No. 5-76045 and Japanese Patent Application Laid-Open No. 2001-244754) in which a protective set value with a magnitude which is such that there is no danger of damage to the amplifier is set for the reflected power, and control that limits the high-frequency output (forward power or effective power) that is supplied to the load from the high-frequency power supply device is performed so that the reflected power from the load does not exceed the protective set value, thus protecting the amplifier from the reflected power.

Furthermore, for example, in Japanese Patent Application Laid-Open No. 11-233294 and Japanese Patent Application Laid-Open No. 2001-35699, high-frequency power supply devices are described in which the loss generated in the amplifier is determined, and the output of the amplifier is controlled so that this loss is maintained at a value that is equal to or less than a loss set value set in the vicinity of the maximum value of the range in which there is no damage to the amplifier.

However, in conventional methods for protecting the amplifier from the reflected power in a high-frequency power supply device, in cases where the loss generated in the amplifier by the reflected power increases so that there is a danger of damage to the amplifier, protection of the amplifier is accomplished by lowering the output of the amplifier. As a result, the following problem arises: namely, when control that protects the amplifier is performed, the power supply output (forward power or effective power) is limited to a value that is considerably lower than the set value.

Especially in cases where the impedance of the load that is connected between the output terminals of the high-frequency power supply device varies, even if the magnitude of the reflection coefficient is the same, the maximum high-frequency output (i.e., the maximum value of the forward power or effective power that is output from the high-frequency power supply device) varies if the phase angle of the reflection coefficient varies. Accordingly, the following problem arises: namely, the maximum high-frequency output is conspicuously reduced with respect to the load impedance at which the phase angle of the reflection coefficient shows a specified value.

Furthermore, if an attempt is made to increase the maximum high-frequency output of the high-frequency power supply device with respect to a load at which the phase angle of the reflection coefficient shows a specified value, the loss generated in the amplifier is increased, so that there is a danger that the amplifier will be damaged by the heat generated by this loss. In concrete terms, the junction temperature of the semiconductor amplifier elements installed in the amplifier exceeds the permissible value, so that there is a danger that these semiconductor amplifier elements will be damaged. As a result, it is substantially impossible to increase the maximum high-frequency output of the high-frequency power supply device with respect to a load at which the phase angle of the reflection coefficient shows a specified value.

SUMMARY OF THE INVENTION

It is an object of the present invention to provide a high-frequency power supply device that can provide a high-frequency output (forward power or effective power) which is greater than a conventional output to the load without damaging the amplifier in cases where a load which is such that the loss generated in the amplifier is increased is connected.

According to a first aspect of the present invention, there is provided a high-frequency power supply device including an oscillator to output a high-frequency signal, an amplifier to amplify the output of the oscillator for supplying a high-frequency output to a load, and a direct-current power supply to supply a direct-current power voltage to the amplifier. The high-frequency power supply device further comprises: a loss calculator that calculates a loss generated in the amplifier; a first controller which, when the calculated loss by the loss calculator exceeds a loss set value determined beforehand, causes the direct-current power voltage supplied to the amplifier from the direct-current power supply to be lowered until the calculated loss becomes equal to the loss set value, the first controller further causing, when the calculated loss is no greater than the loss set value, the direct-current power voltage supplied to the amplifier from the direct-current power supply to be maintained at an appropriate direct-current voltage set value; and a second controller to control the output of the oscillator or the amplifier so that the high-frequency output supplied to the load from the amplifier approaches a high-frequency output set value.

Preferably, the loss set value is set to be no greater than a permissible maximum loss generated in the amplifier when the heat generated in the amplifier reaches an upper limit of a permissible range.

The direct-current voltage set value may preferably be set at a value that maximizes the efficiency of the amplifier within a range that causes no distortion of the waveform of the high-frequency output.

The loss calculator may preferably calculate the loss generated in a semiconductor element constituting the amplifier. In this case, the loss set value may preferably be set at a value that is no greater than the permissible maximum loss generated in the semiconductor elements constituting the amplifier when the heat generated in the semiconductor elements reaches the upper limit of the permissible range.

Preferably, the first controller may cause, when the calculated loss by the loss calculator exceeds a first loss set value determined beforehand, the output voltage of the direct-current power supply to be lowered within a range that does not fall below a predetermined lower limit value in order to make the calculated loss equal to the first loss set value. The first controller may further cause, when the calculated loss is no greater than the first loss set value, the direct-current power voltage supplied to the amplifier from the direct-current power supply to be maintained at an appropriate direct-current voltage set value. The second controller may control, when the direct-current power voltage is greater than the lower limit value, the output of the oscillator or the amplifier so that the high-frequency output supplied to the load from the amplifier approaches a high-frequency output set value. The second controller may further control, when the direct-current power voltage is no greater than the lower limit value, the output of the oscillator or the amplifier in order to make the calculated loss equal to the first loss set value or to a second loss set value which is slightly greater than the first loss set value. In this case, the first loss set value and the second loss set value are set to be no greater than a permissible maximum loss generated in the amplifier when heat generated in the amplifier reaches an upper limit of a permissible range.

The loss calculator may preferably calculate the loss that is generated in the semiconductor element constituting the amplifier. In this case, it is desirable that the first loss set value and the second loss set value be set at values that are no greater than the permissible maximum loss generated in the semiconductor element constituting the amplifier when the heat generated in the semiconductor element reaches an upper limit of a permissible range.

In the above high-frequency power supply device, when it is detected that the loss generated in the amplifier exceeds the loss set value, the first controller lowers the direct-current power voltage to reduce the loss down to a loss set value. At the same time, the second controller raises the high-frequency output toward a preset value. Accordingly, in a case where a load which causes a large loss in the amplifier is connected, the high-frequency power (forward power or effective power) supplied to the load can be increased compared to a conventional device while keeping the loss at the loss set value (permissible loss). Furthermore, since the loss that is generated in the amplifier is always limited to the loss set value, damage to the semiconductor elements that constitute the amplifier can be prevented.

Furthermore, in a case where a lower limit value is set for the direct-current power voltage, and the device is constructed so that a control action that lowers the direct-current power voltage is performed by the first controller in a range in which the direct-current power voltage does not fall below the lower limit value, and so that in cases where the direct-current power voltage falls below the lower limit value, the output of the oscillator or the amplifier is controlled by the second control in order to make the calculated loss value equal to the first loss set value or to a second loss set value which is set at a value that is slightly greater than the first loss set value, control can be performed which limits the loss that is generated in the amplifier without lowering the direct-current power voltage to a value that is lower than the lower limit value.

According to a second aspect of the present invention, there is provided a high-frequency power supply device including an oscillator to output a high-frequency signal, an amplifier to amplify an output of the oscillator for supplying a high-frequency output to a load, and a direct-current power supply to supply a direct-current power voltage to the amplifier. The high-frequency power supply device may further comprise: a junction temperature calculator that calculates junction temperature of a semiconductor amplifier element provided in the amplifier; a first controller causes, when the calculated junction temperature by the junction temperature calculator exceeds a junction temperature set value determined beforehand, the direct-current power voltage supplied to the amplifier from the direct-current power supply to be lowered until the calculated junction temperature becomes equal to the junction temperature set value, the first controller further causing, when the calculated junction temperature is no greater than the junction temperature set value, the direct-current power voltage supplied to the amplifier from the direct-current power supply to be maintained at an appropriate direct-current voltage set value; and a second controller which controls the output of the oscillator or the amplifier so that the high-frequency output supplied to the load from the amplifier approaches a high-frequency output set value.

Preferably, the junction temperature set value may be set to be no greater than a permissible maximum value of the junction temperature of the semiconductor amplifier element.

Preferably, the direct-current voltage set value may be set at a value that maximizes efficiency of the amplifier within a range that causes no distortion of a waveform of the high-frequency output.

Preferably, the first controller may cause, when the calculated junction temperature by the junction temperature calculator exceeds a first junction temperature set value determined beforehand, the output voltage of the direct-current power supply to be lowered within a range that does not fall below a predetermined lower limit value in order to make the calculated junction temperature equal to the first junction temperature set value. The first controller may further cause, when the calculated junction temperature is no greater than the first junction temperature set value, the direct-current power voltage supplied to the amplifier from the direct-current power supply to be maintained at an appropriate direct-current voltage set value. The second controller may control, when the direct-current power voltage is greater than the lower limit value, the output of the oscillator or the amplifier so that the high-frequency output supplied to the load from the amplifier approaches a high-frequency output set value. The second controller may further control, when the direct-current power voltage is no greater than the lower limit value, the output of the oscillator or the amplifier in order to make the calculated junction temperature equal to the first junction temperature set value or to a second junction temperature set value which is slightly higher than the first junction temperature set value. In this case, the first junction temperature set value and the second junction temperature set value may be set to be no greater than the permissible maximum value of the junction temperature of the semiconductor amplifier element.

In this high-frequency power supply device, when it is detected that the junction temperature of the semiconductor amplifier element exceeds the junction temperature set value, the first controller lowers the direct-current power voltage to reduce the calculated junction temperature value to a junction temperature set value. At the same time, the second controller raises the high-frequency output toward a set value. Accordingly, in a case where a load causing a large loss in the amplifier is connected, the high-frequency power (forward power or effective power) that can be supplied to the load can be increased compared to a conventional device while keeping the calculated junction temperature value at the junction temperature set value.

Furthermore, since the junction temperature of the semiconductor amplifier element can always be limited to the junction temperature set value, damage to the semiconductor amplifier element constituting the amplifier can be prevented.

Furthermore, in cases where a lower limit value is set for the direct-current power voltage, and the device is constructed so that a control action that lowers the direct-current power voltage is performed by the first controller in a range in which the direct-current power voltage does not fall below the lower limit value, and so that in cases where the direct-current power voltage falls below the lower limit value, the output of the oscillator or the amplifier is controlled by the second controller in order to make the calculated loss value equal to the first junction temperature set value or to a second junction temperature set value which is set at a value that is slightly greater than the first junction temperature set value, control can be performed which limits the junction temperature value of the semiconductor amplifier element without lowering the direct-current power voltage to a value that is lower than the lower limit value.

DESCRIPTION OF THE PREFERRED EMBODIMENTS

Examples of the high-frequency power supply device of the present invention will be described below with reference to the attached figures.

First Embodiment

Figure 1:
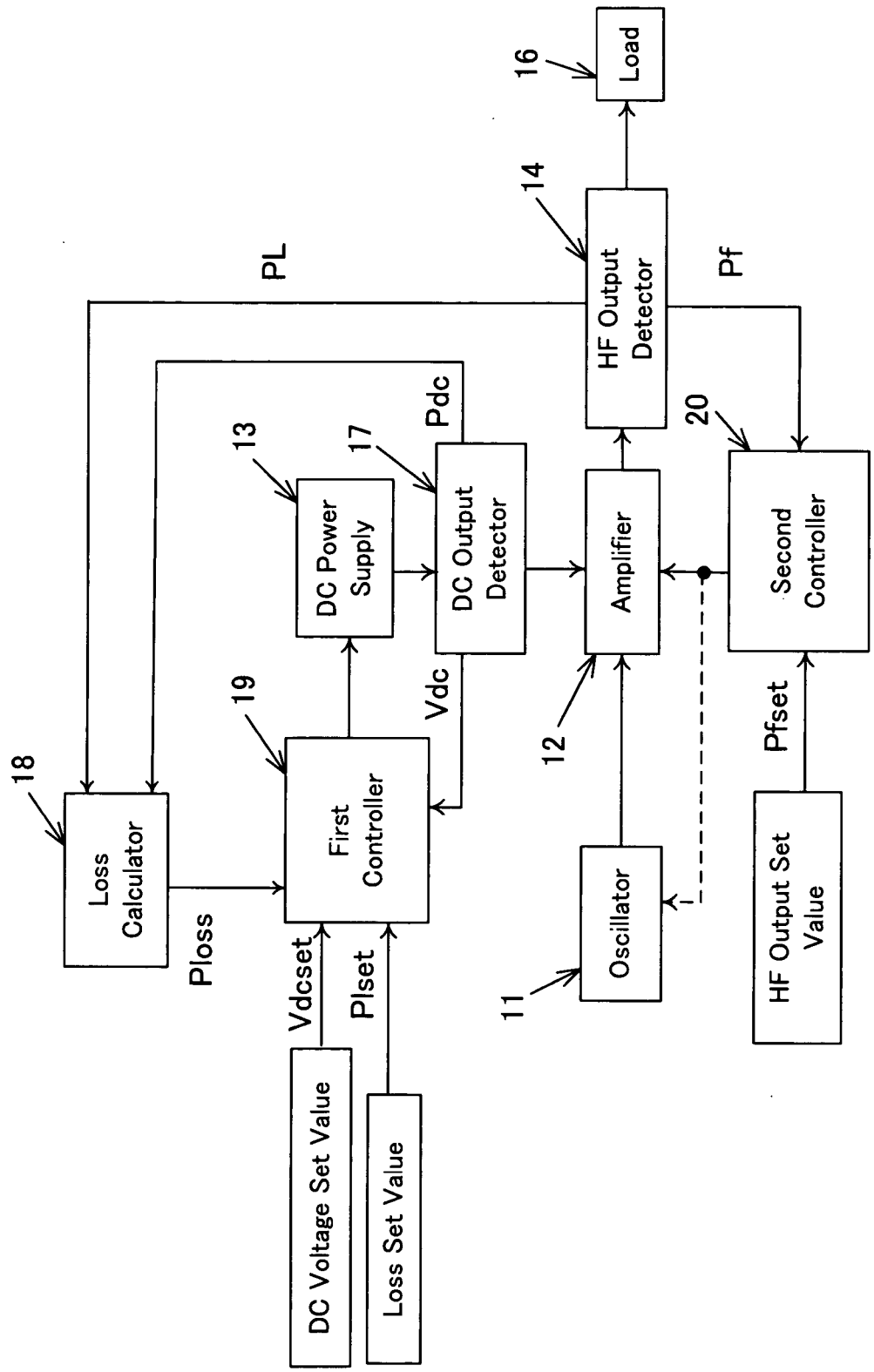
FIG. 1 is a block diagram which shows a first construction of the high-frequency power supply device of the present invention.

FIG. 1 shows an example of the construction of the high-frequency power supply device of the present invention. In the same figure, 11 indicates an oscillator that generates a high-frequency signal with a specified frequency, 12 indicates an amplifier that amplifies the output of the oscillator 11, 13 indicates a direct-current power supply that supplies a direct-current power voltage to the amplifier 12, and 14 indicates a high-frequency output detector that detects the high-frequency output of the amplifier 12. The output of the amplifier 12 is supplied to a load 16 via the high-frequency output detector 14.

Furthermore, 17 indicates a direct-current output detector which detects the direct-current power voltage Vdc that is supplied to the amplifier 12 from the direct-current power supply 13, and 18 indicates a loss calculator which calculates the loss that is generated in the amplifier. The output Pdc of the direct-current output detector 17 and the output PL of the high-frequency output detector 14 are input into this loss calculator 18.

19 indicates a first controller which controls the direct-current power supply 13 in accordance with the loss calculated by the loss calculator 18, and 20 indicates a second controller which controls the oscillator 11 or amplifier 12 so that the high-frequency output that is supplied to the load 16 from the amplifier 12 is caused to approach a high-frequency output set value.

Figure 2:
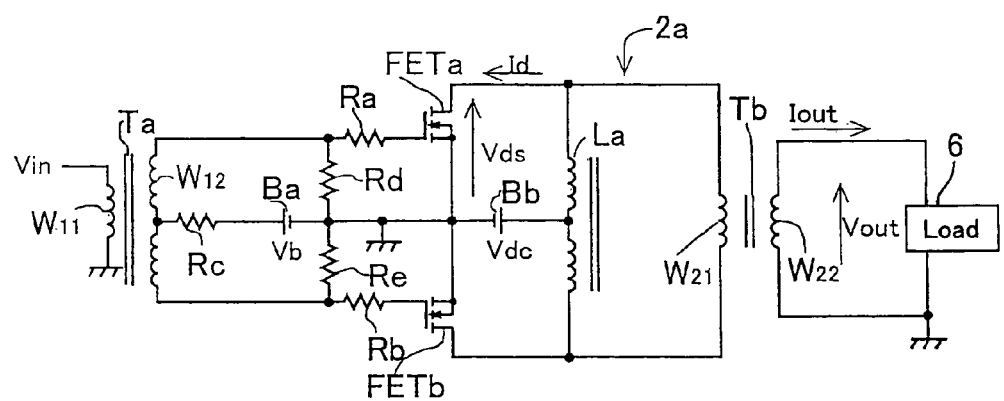
FIG. 2 is a circuit diagram which shows an example of the construction of the amplifier used in the high-frequency power supply.

The oscillator 11 is constructed from an oscillator and (if necessary) an amplifier that amplifies the output of this oscillator, and the amplifier 12 is constructed from an amplifier. An amplifier having the construction shown in FIG. 2 can be used as this amplifier. In regard to the amplifier shown in this figure, a circuit construction example based on the amplifier 2a shown in FIG. 22, which is used in a high-frequency power supply device, is shown. The amplifier shown in FIG. 2 is a universally known push-pull type amplifier, and comprises an input transformer Ta which has a primary coil W11 and a secondary coil W12 equipped with an intermediate tap, a pair of n channel type field effect transistors FETa and FETb whose sources are connected in common and grounded, resistors Ra and Rb which are respectively connected between the gate of the field effect transistor FETa and one end of the secondary coil W12 of the transformer Ta, and between the gate of the field effect transistor FETb and the other end of the secondary coil W12, a bias power supply Ba whose positive terminal is connected to the intermediate tap of the secondary coil W12 via a resistor Rc, and whose negative terminal is grounded, resistors Rd and Re which are respectively connected between one end of the secondary coil W12 of the transformer Ta and the ground, and between the other end of this secondary coil W12 and the ground, a coil La equipped with an intermediate tap which is connected between the drain of the field effect transistor FETa and the drain of the field effect transistor FETb, a direct-current power supply Bb whose negative terminal is connected toward the ground side between the intermediate tap of the coil La and the ground, and which outputs a power voltage Vdc, and an output transformer Tb whose primary coil W21 is connected to both ends of the coil La. A load 6 is connected to both ends of the secondary coil W22 of the output transformer Tb.

Figure 3:
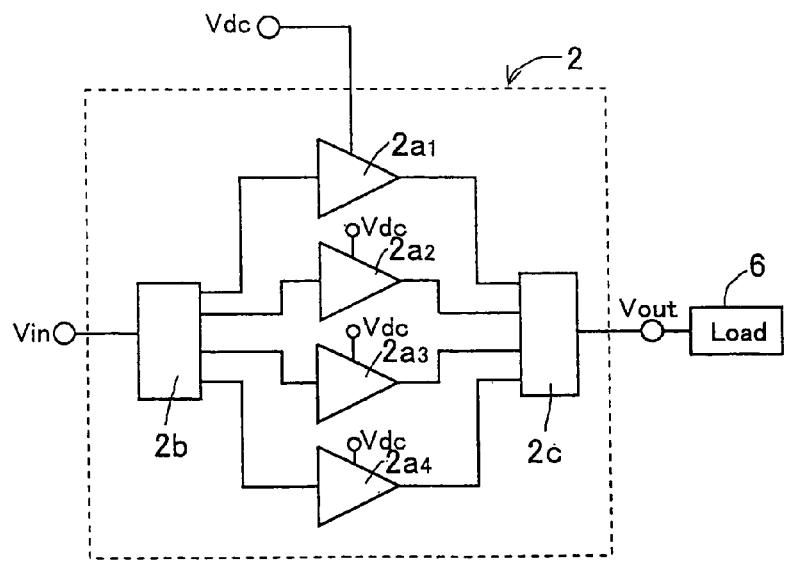
FIG. 3 is a circuit diagram which shows another example of the construction of the amplifier used in the high-frequency power supply.
Figure 22:
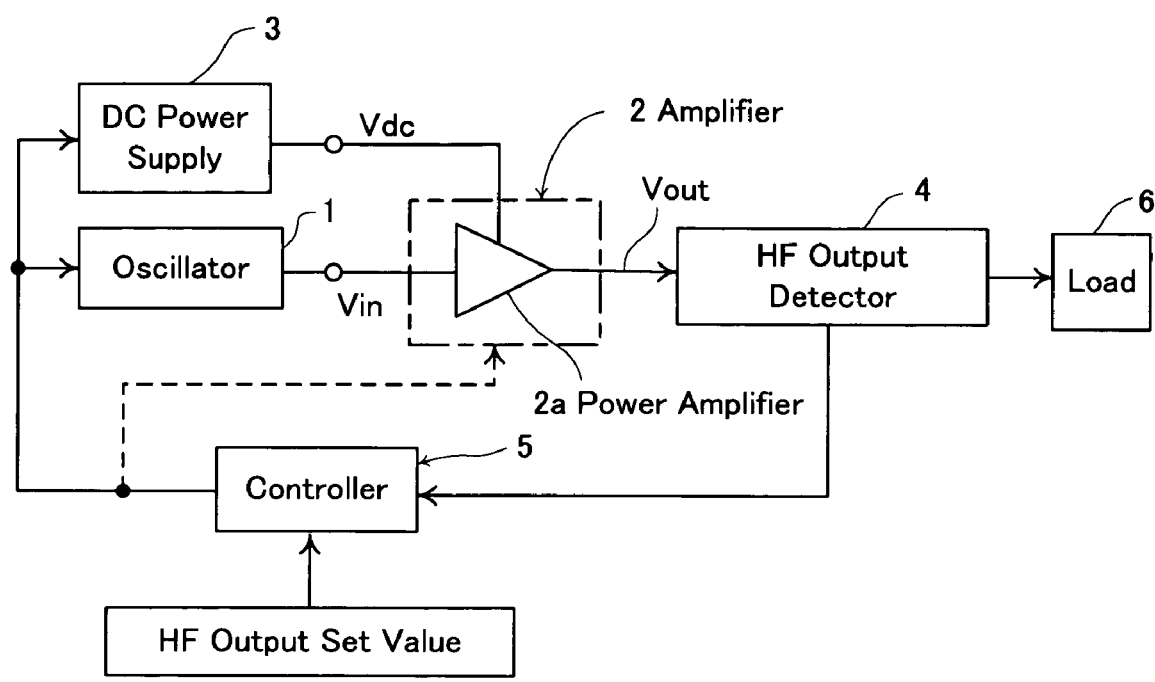
FIG. 22 is a circuit diagram which shows the basic construction of a conventional high-frequency power supply.

The amplifier 12 may comprise a single amplifier as in the example shown in FIG. 22, or may comprise a plurality of amplifiers as shown in FIG. 3. In the example shown in FIG. 3, an amplifier 12 is constructed from a plurality of amplifiers 2a1 through 2a4 which operate with the output voltage Vdc of a direct-current power supply (not shown in the figures) as a power voltage, a power distributor 2b which distributes and inputs a high-frequency signal Vin supplied from an oscillator (not shown in the figures) into the amplifiers 2a1 through 2a4, and a power synthesizer 2c which synthesizes the outputs of the amplifiers 2a1 through 2a4 and supplies the synthesized output to the load 6.

Furthermore, the circuit construction of the amplifier is not limited to the construction shown in FIG. 2; any type of amplifier may be used as long as this amplifier is a power amplifier circuit which frequency characteristics that allow the amplification of the output of the oscillator 11.

The high-frequency output detector 14 detects the output information of the amplifier 12. Methods that can be used to detect the output information include a method in which the forward power Pf and reflected power Pr [W] are determined from the output voltage Vout [V] and output current Iout [A] of the amplifier 12, and a method in which the high-frequency effective output power (power consumed by the load) PL=Vout×Iout×cos θ [W] that is supplied to the load 16 is determined from the output voltage Vout [V], output current Iout [A] and phase difference θ between these values.

Furthermore, the relationship PL=Pf−Pr [W] holds true for the high-frequency effective output power PL, forward power Pf and reflected power Pr.

The direct-current output detector 17 detects the output voltage Vdc [V] an output current Idc [A] of direct-current power supply 13, and uses these values to determine the direct-current power Pdc=Vdc×Idc [W] that is supplied to the amplifier 12 from the direct-current output detector 17.

The loss calculator 18 determines the loss Ploss (=Pdc−PL) [W] that is generated in the amplifier 12 by subtracting the high-frequency effective output power PL determined by the high-frequency output detector 14 from the direct-current output power Pdc of the direct-current power supply 13 determined by the direct-current output detector 17.

Furthermore, the loss calculator 18 may also be constructed so as to determine the loss Ploss (=Pdc−Pf+Pr) that is generated in the amplifier 12 by adding the reflected power Pr to the value obtained by subtracting the forward power Pf from the direct-current power Pdc that is supplied to the amplifier 12 from the direct-current power supply 13.

The first controller 19 inputs the calculated loss value Ploss that is calculated by the loss calculator 18, the direct-current power voltage Vdc that is detected by the direct-current output detector 17, the direct-current voltage set value Vdcset and the loss set value Plset, and is constructed so that in cases where the calculated loss value Ploss calculated by the loss calculator 18 exceeds the loss set value Plset that is set beforehand, this controller performs a control action that lowers the direct-current power voltage Vdc that is supplied to the amplifier 12 from the direct-current power supply 13 until the calculated loss value Ploss is equal to the loss set value Plset, and so that in cases where the calculated loss value Ploss is equal to or less than the loss set value Plset, this controller performs a control action that maintains the direct-current power voltage Vdc that is supplied to the amplifier 12 from the direct-current power supply 13 at a direct-current voltage set value Vdcset that is set at an appropriate value.

Furthermore, the direct-current voltage set value Vdcset that is set for the direct-current power voltage Vdc may be a fixed value or a variable value; this value is set at a value that is suitable for the efficient operation of the amplifier 12. The direct-current power voltage Vdc that is suitable for the efficient operation of the amplifier 12 varies according to the magnitude of the set value (high-frequency output set value) Pfset of the output Pout of the high-frequency power supply device; accordingly, it is desirable to devise the system so that the direct-current voltage set value Vdcset is varied in accordance with the high-frequency output set value Pfset in such a manner that the efficiency η (=Pout/Pdc) of the amplifier 12 is maximized in accordance with the high-frequency output set value Pfset.

A method for thus controlling the direct-current power voltage of the amplifier in accordance with the output set value is already universally known, as is described in Japanese Patent Application Laid-Open No. 2001-197749.

Furthermore, the second controller 20 inputs the high-frequency output Pf that is detected by the high-frequency output detector 14 and the high-frequency output set value Pfset, and is constructed so as to control the output of the oscillator 11 or amplifier 12 so that the high-frequency output that is supplied to the load 16 from the amplifier 12 is caused to approach the high-frequency output set value Pfset.

In the high-frequency power supply device shown in FIG. 1, when the loss that is generated in the amplifier 12 exceeds the loss set value Plset, the first controller 19 performs a control action so that the direct-current power voltage Vdc that is supplied to the amplifier 12 from the direct-current power supply 13 is lowered; accordingly, the output of the amplifier 12 drops, and the loss that is generated in the amplifier 12 also decreases. In this case, since the second controller 20 controls the oscillator 11 or amplifier 12 so that the high-frequency output (forward power or effective power) that is supplied to the load 16 from the amplifier 12 is caused to approach the high-frequency output set value Pfset (set value of the forward power or set value of the effective power), thus increasing the output of the amplifier 12, the drop in the output of the amplifier 12 is suppressed. When the second controller 20 increases the output of the amplifier 12, the loss generated in the amplifier 12 tends to increased; however, the first controller 19 suppresses this increase in the loss, so that the loss generated in the amplifier 12 is maintained at the loss set value Plset.

When the control by the first controller 19 that lowers the direct-current power voltage Vdc and maintains the loss generated in the amplifier 12 at the loss set value Plset and the control by the second controller 20 that increases the output of the amplifier 12 are balanced, the control operations performed by the first controller 19 and second controller 20 stop, so that the high-frequency output is stabilized.

Thus, in the present invention, when it is detected that the loss Ploss generated in the amplifier 12 has exceeded the loss set value Plset, a control action that raises the high-frequency output toward the high-frequency output set value Pfset is performed at the same time that a control action that lowers the direct-current power voltage Vdc and reduces the loss to the loss set value Plset is performed; accordingly, in cases where a load 16 which is such that a large loss is generated in the amplifier 12 is connected, the high-frequency power (forward power or effective power) that can be supplied to the load 16 while keeping the loss to the loss set value (permissible loss) Plset can be increased compared to a conventional device.

Furthermore, since the loss that is generated in the amplifier 12 is always limited to the loss set value Plset, damage to the semiconductor amplifier elements that constitute the amplifier 12 (i.e., the field effect transistors FETa and FETb in the example shown in FIG. 2) can be prevented.

Here, the results of a simulation performed in a cases where the amplifier 12 was constructed using a set of the amplifiers 2a shown in FIG. 2 in the high-frequency power supply device shown in FIG. 1 will be described. The simulation conditions were as follows: specifically, the frequency of the input voltage Vin that was input from the oscillator and the output frequency of the high-frequency power supply device were set at 10 MHz, the direct-current power voltage Vdc was set at 200 [V], an the load impedance in the case of matching was set at 50 Ω (pure resistance). Furthermore, it was assumed that a B grade operation was performed by applying a bias voltage of Vb to the gates of the field effect transistors FETa and FETb from the bias power supply Ba. The high-frequency output that is the object of control may be either the forward power or the effective power (power consumed by the load); here, however, the forward power was taken as the high-frequency output that was the object of control, and this high-frequency output was controlled so as to make this output equal to the high-frequency output set value Pfset.

In a case where 50 Ω (pure resistance) which is the load impedance in the case of matching is connected to the high-frequency power supply device, it is seen from the simulation results that the maximum high-frequency output (maximum forward power) that is supplied to the load is approximately 1200 W, and that the losses (mean values) generated in the respective field effect transistors FET are respectively 200 [W]. Furthermore, in a case where the load impedance is not matched with the output impedance of the high-frequency power supply device, the maximum high-frequency output (maximum forward power) that can be output from the high-frequency power supply device (amplifier) varies greatly according to the load impedance.

Table 1 shows the maximum value of the forward power that could be supplied to the respective loads from the amplifier, the reflected power from the loads, the losses of the respective FETs, the heat sink temperatures of the contact surfaces with the FETs, and the junction temperatures of the FETs, that were obtained when connecting the amplifier shown in FIG. 2 to eight types of loads in which the magnitude of the reflection coefficient was 0.714 (standing wave ratio SWR=6:1), and the respective phase angles of the reflection coefficient were 0 degrees, −45 degrees, −90 degrees, −135 degrees, −180 degrees, −225 degrees, −270 degrees and −315 degrees.

Furthermore, in this case, the direct-current power voltage Vdc that was supplied to the amplifier was 200 [V], the permissible value of the FET loss was 300 W, the rated value of the FET junction temperature was 150° C., the heat resistance of the FETs was 0.2° C./W, the ambient temperature of the heat sinks cooling the FETs was 45° C., an the heat resistance of the heat sinks was 0.15° C./W.

Furthermore, for purposes of comparison, Table 2 shows a determination of the magnitude of the maximum high-frequency output that could be supplied to the load from the amplifier in a conventional high-frequency power supply device.

Moreover, in Table 2, in a case where a load in which the phase angle of the reflection coefficient was 0 degrees was connected, and in a case where a load in which the phase angle of the reflection coefficient was −45 degrees was connected, the maximum loss generated in the field effect transistors FETa and FETb was less than 300 W, and the heat sink temperature of the field effect transistors FETa and FETb was less than 150° C. However, in the case of these loads, if the input signal Vin is increased in order to obtain a further increase in the high-frequency output, the drain loss values of 210 [W] and 230 [W] shown by the field effect transistors FETa and FETb are substantially the maximum loss values in the B grade operating region, since the amplifier deviates from the B grade operation, and the junction temperatures of 118.5 [° C.] and 125.5 [° C.] shown by the field effect transistors FETa and FETb are substantially the highest junction temperatures in the B grade operating region.

In a conventional high-frequency power supply device, as shown in Table 2, respective high-frequency output power values (forward power values in this example) of only 130 [W], 65 [W], 45 [W], 52 [W], 86 [W] an 240 [W] can be obtained in cases where the respective load impedance values are 16.2−j47.3Ω, 9.7−j20Ω, 8.3Ω, 9.7+j20Ω, 16.2+j47.3Ω and 49+j101Ω. However, in the case of the high-frequency power supply device of the present invention, as shown in Table 1, high-frequency output values of 330 [W], 550 [W], 410 [W], 360 [W], 234 [W] and 360 [W] can be obtained, so that the high-frequency output can be greatly increased compared to that obtained in a conventional device.

FIGS. 4A through 4E show the simulated waveforms (for a time t) of the drain voltage Vds and drain current Id of the field effect transistor FETa, and the high-frequency output voltage Vout, high-frequency output current Iout and loss Vds×Id of the amplifier 12 in a case where a load of 9.7−j20Ω was connected in the high-frequency power supply device of the present invention. Furthermore, FIGS. 5A through 5E show the simulated waveforms (for a time t) of the drain voltage Vds and drain current Id of the field effect transistor FETa, and the high-frequency output voltage Vout, high-frequency output current Iout and loss Vds×Id of the amplifier 12 in a case where a load of 9.7−j20Ω was connected in a conventional high-frequency power supply device.

Figure 4:
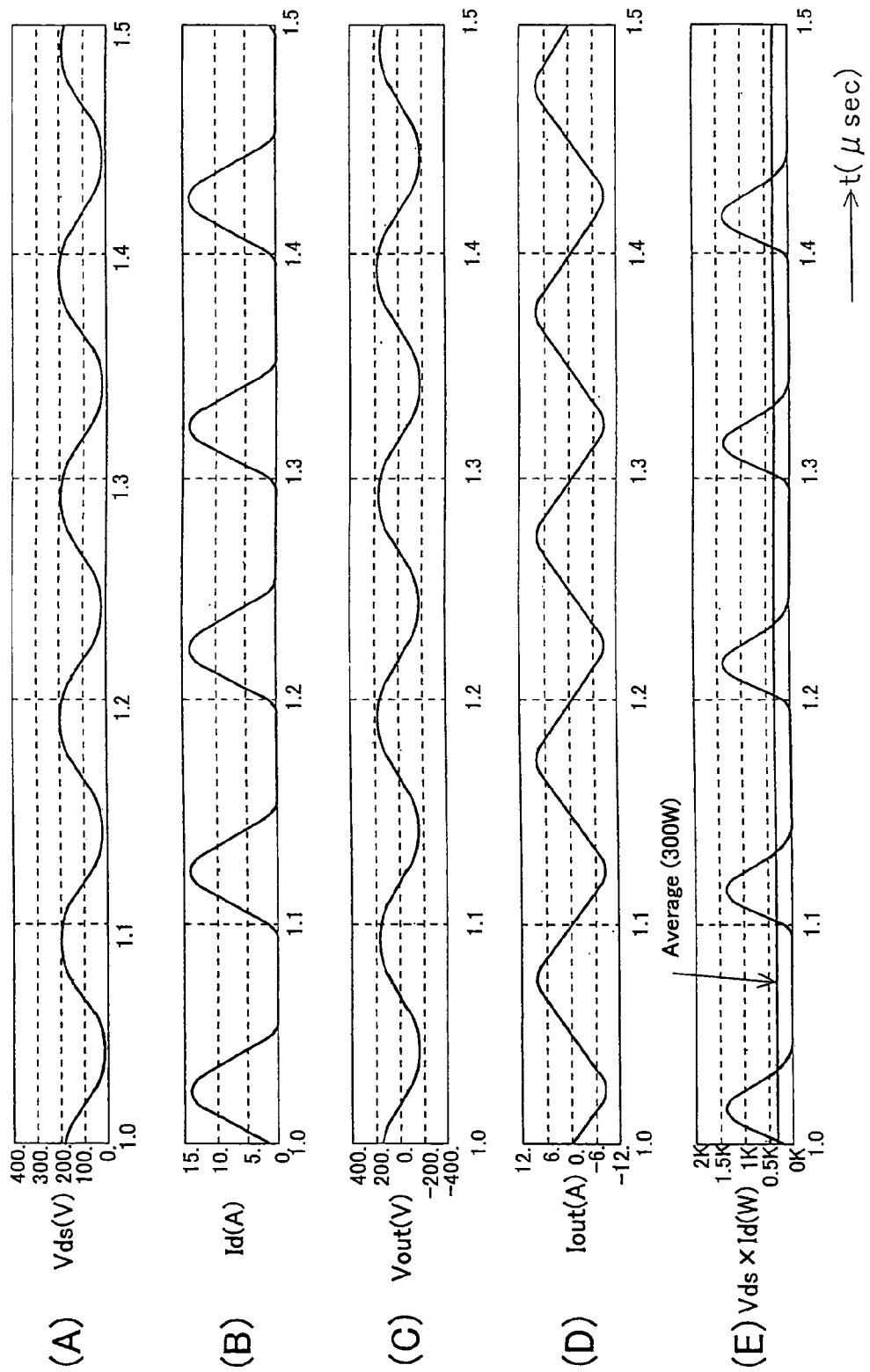
FIG. 4 is a waveform diagram which shows the simulated waveforms of the FET drain voltage and drain current of the amplifier, and the high-frequency output voltage, high-frequency output current and loss of the amplifier, obtained in a case where a specified load was connected to the high-frequency power supply device shown in FIG. 1, in which the amplifier was constructed using a set of the amplifiers shown in FIG. 2.
Figure 5:
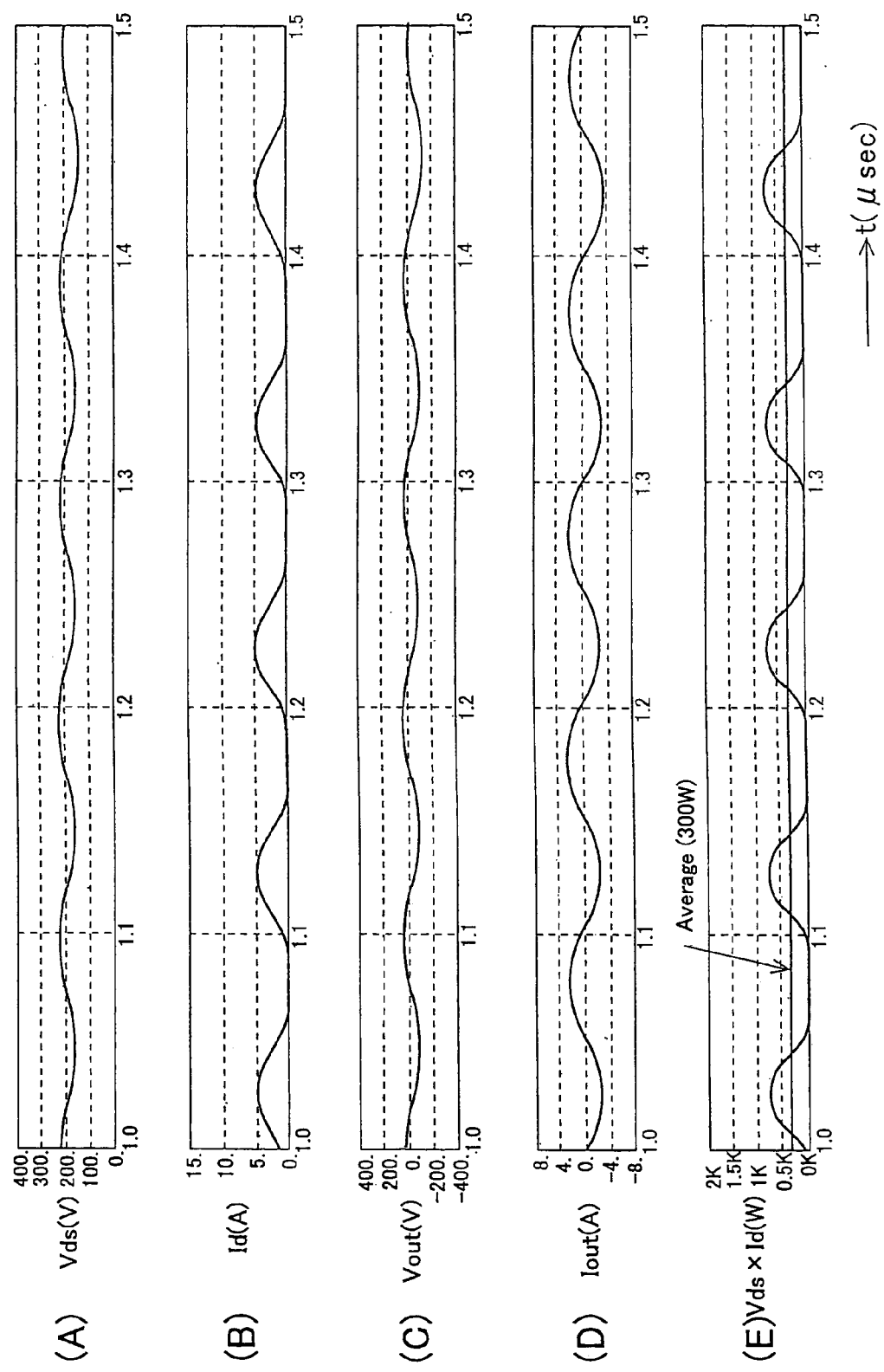
FIG. 5 is a waveform diagram which shows the simulated waveforms (with respect to time) of the FET voltage and drain current, and the output voltage, output current and FET drain loss of the amplifier, obtained in a case where a specified load was connected to the amplifier shown in FIG. 2.

If FIGS. 4 and 5 are compared, it is seen that while the loss of the field effect transistor FETa is approximately 300 [W] (mean value) in both the high-frequency power supply device of the present invention and the conventional high-frequency power supply device, the high-frequency output (Iout×Vout) of the high-frequency power supply device of the present invention is greatly increased compared to that of the conventional high-frequency power supply device.

In the present invention, as was described above, a control action that lowers the direct-current power voltage Vdc so that the loss generated in the amplifier 12 is reduced to the loss set value Plset is performed, and at the same time, a control action that raises the high-frequency output Pf toward the high-frequency output set value Pfset is performed, in cases where it is detected that the loss generated in the amplifier 12 exceeds the loss set value Plset. Accordingly, in cases where a load 16 which is such that a large loss is generated in the amplifier 12 is connected, the high-frequency power (forward power or effective power) that can be supplied to the load 16 can be increased compared to that in a conventional device while the loss that is generated in the amplifier 12 is kept to the loss set value (permissible loss) Plset. Furthermore, since the loss that is generated in the amplifier 12 is always limited to the loss set value Plset, damage to the semiconductor amplifier elements that constitute the amplifier 12 can be prevented.

Second Embodiment

In the present invention, as was described above, a control action that lowers the direct-current power voltage Vdc of the amplifier 12 is performed in cases where the loss that is generated in the amplifier 12 exceeds the loss set value Plset. However, in order to operate the amplifier 12 in a stable manner, it is necessary to avoid lowering the direct-current power voltage Vdc to a value that is lower than the lower limit value of the permissible fluctuation range of the direct-current power voltage Vdc (the fluctuation range that is permitted while confirming stable operation of the amplifier 12).

Figure 6:
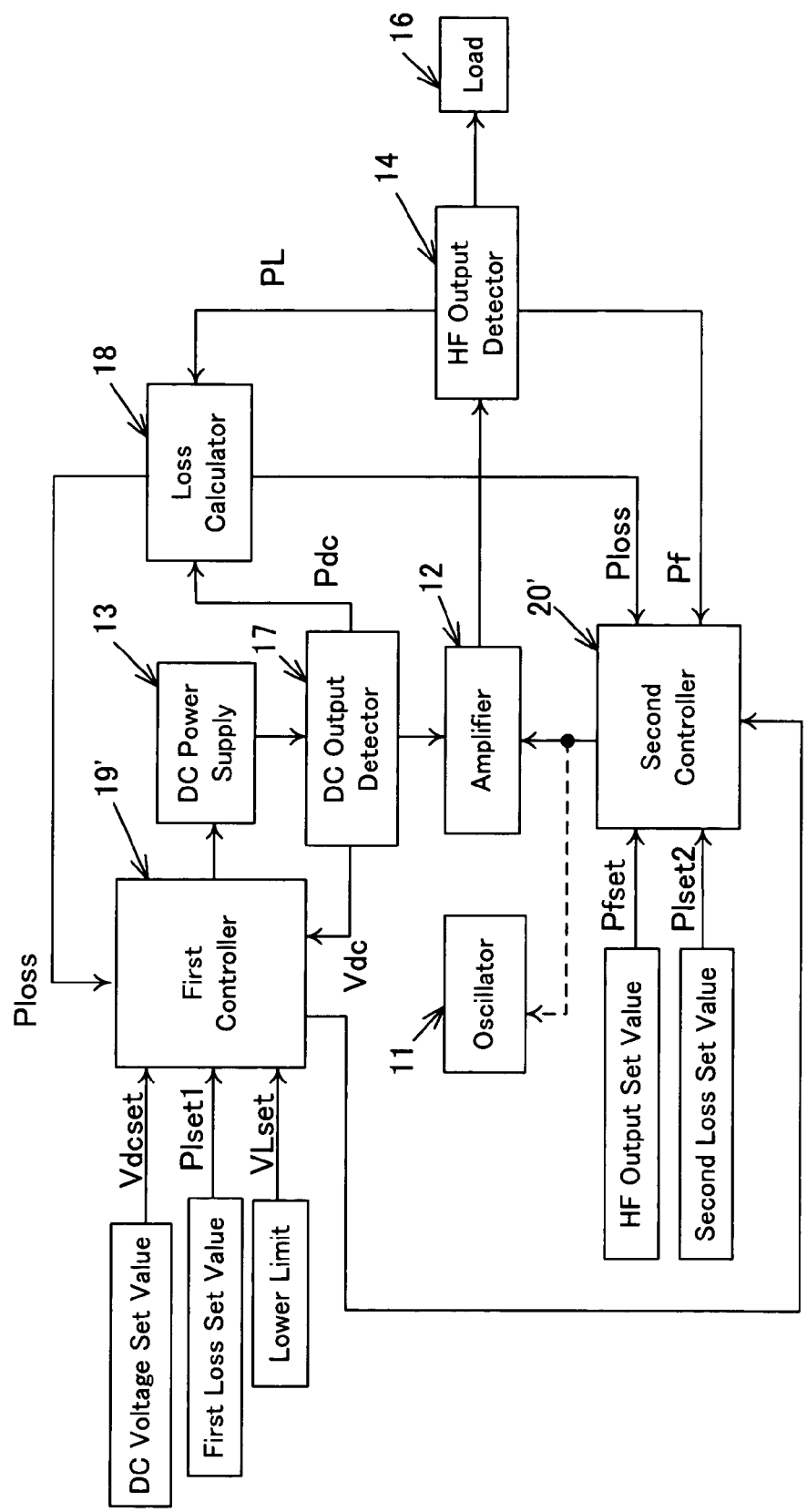
FIG. 6 is a block diagram which shows the construction of a second embodiment of the high-frequency power supply device of the present invention.

FIG. 6 shows an embodiment of the present invention in which the high-frequency power supply device is devised so that lowering of the direct-current power voltage to a value lower than the lower limit value VLset is prevented. In the embodiment shown in FIG. 6, the direct-current voltage set value Vdcset, a first loss set value Plset1 and the lower limit value VLset of the direct-current power voltage are input into a first controller 19' along with the output of the loss calculator 18 and the output of the direct-current output detector 17, and the output of the high-frequency output detector 14, the high-frequency output set value Pfset, a second loss set value Plset2 and the calculated loss value Ploss calculated by the loss calculator 18 are input into a second controller 20'. Furthermore, a signal which indicates whether the output voltage of the direct-current power supply 13 is greater than the lower limit value VLset or equal to or less than the lower limit value VLset is sent from the first controller 19'.

The first controller 19' shown in FIG. 6 is constructed so that in cases where the calculated loss value that is calculated by the loss calculator 18 is equal to or less than the first loss set value Plset1 that is set beforehand, this first controller performs a control action that maintains the direct-current power voltage Vdc that is supplied to the amplifier 12 from the direct-current power supply 13 at a direct-current voltage set value Vdcset that is set at an appropriate value, and so that in cases where the calculated loss value Ploss exceeds the first loss set value Plset1, this first controller performs a control action that lowers the output voltage of the direct-current power supply 13 within a range that does not fall below a predetermined lower limit value VLset, in order to make the calculated loss value Ploss equal to the first loss set value Plset1.

Furthermore, the second controller 20' is constructed so that in cases where the direct-current power voltage Vdc is greater than the lower limit value VLset, this controller controls the output of the oscillator 11 or amplifier 12 so that the high-frequency output of the amplifier 12 that is detected by the high-frequency output detector 14 is caused to approach the high-frequency output set value Pfset, and so that in cases where the direct-current power voltage Vdc is equal to or less than the lower limit value VLset, this controller controls the output of the oscillator 11 or amplifier 12 so that the calculated loss value Ploss is made equal to a second loss set value Plset2 which is set at a value that is equal to the first loss set value Plset1 or slightly greater than the first loss set value Plset1.

The first loss set value Plset1 and second loss set value Plset2 ($\geq$Plset1) are set at values that are equal to or less than the value of the loss that is generated in the amplifier 12 when the heat that is generated by the semiconductor amplifier elements that constitute the amplifier 12 reaches the upper limit of the permissible range. In all other respects, this embodiment is the same as the embodiment shown in FIG. 1.

In the embodiment shown in FIG. 6, in cases where the calculated loss value Ploss does not exceed the first loss set value Plset1, the first controller 19' performs a control action so that the output voltage Vdc of the direct-current power supply 13 is maintained at the direct-current voltage set value Vdcset, which is set at an appropriate value. Furthermore, in cases where the loss Ploss calculated by the loss calculator 18 exceeds the first loss set value Plset1, the first controller 19' performs a control action so that the output voltage Vdc of the direct-current power supply 13 is lowered in a range that does not fall below the lower limit value VLset, thus lowering the output of the amplifier 12 so that the calculated loss value (loss generated in the amplifier) Ploss is reduced.

In cases where the output voltage (direct-current power voltage) Vdc of the direct-current power supply 13 is greater than the lower limit value VLset, the second controller 20' controls the output of the oscillator 11 or amplifier 12 so that the high-frequency output Pf of the amplifier 12 that is detected by the high-frequency output detector 14 is caused to approach the high-frequency output set value Pfset. In cases where the direct-current power voltage Vdc is equal to or less than the lower limit value VLset, the second controller 20' controls the output of the oscillator 11 or amplifier 12 so that the calculated loss value Ploss is made equal to the second loss set value Plset2.

In the embodiment shown in FIG. 6, as was described above, since the first controller 19' performs a control action so that the output voltage Vdc of the direct-current power supply 13 is lowered within a range that does not fall below the lower limit value VLset, and thus lowers the output of the amplifier 12, in cases where the loss that is generated in the amplifier 12 exceeds the first loss set value Plset1, there is no loss of the stable operation of the amplifier 12 when the loss that is generated in the amplifier 12 exceeds the first loss set value Plset1, and control that limits the loss generated in the amplifier 12 to the first loss set value Plset1 can be performed.

Furthermore, the second controller 20' performs a control action so that the high-frequency output Pf is caused to approach the high-frequency output set value Pfset in cases where the direct-current power voltage Vdc is equal to or greater than the lower limit value VLset; accordingly, in cases where a load 16 which is such that a large loss is generated in the amplifier 12 is connected, the high-frequency power (forward power or effective power) Pf that can be supplied to the load 16 can be increased compared to that in a conventional device, while keeping the loss to the first loss set value Plset1.

Moreover, in cases where the direct-current power voltage tends to fall below the lower limit value, the second controller 20' controls the output of the oscillator 11 or amplifier 12 so that the calculated loss Ploss is made equal to the second loss set value Plset2, which is set at a value that is equal to the first loss set value Plset1 or slightly greater than the first loss set value Plset1, and the control of the direct-current power voltage Vdc by the first controller 19' (control that lowers the direct-current power voltage Vdc) is stopped. Accordingly, destabilization of the operation of the amplifier 12 as a result of the output of the direct-current power supply 13 falling below the lower limit value VLset can be prevented.

In the embodiments shown in FIGS. 1 and 6, the oscillator 11 can be constructed from a universally known circuit that generates a high-frequency output with a specified frequency, and the direct-current power supply 13 can be constructed from any of various types of direct-current power supply circuits that have the function of controlling the output voltage value Vdc. Furthermore, the loss calculator 18 can be realized by means of an analog calculating circuit or a computer.

In the embodiment shown in FIG. 1 and the embodiment shown in FIG. 3, the first controller 19 or 19' and the second controller 20 or 20' can be constructed from hardware circuits, or can be constructed in terms of software by causing specified programs to be executed by a computer.

[Examples of Construction of Various Parts]

Below, concrete examples of the construction of the direct-current power supply 13, and concrete examples of the constructions of the first controller 19' and second controller 20' will be described using the embodiment shown in FIG. 6 as an example.

(1) Examples of Construction of Direct-Current Power Supply Part

Figure 7:
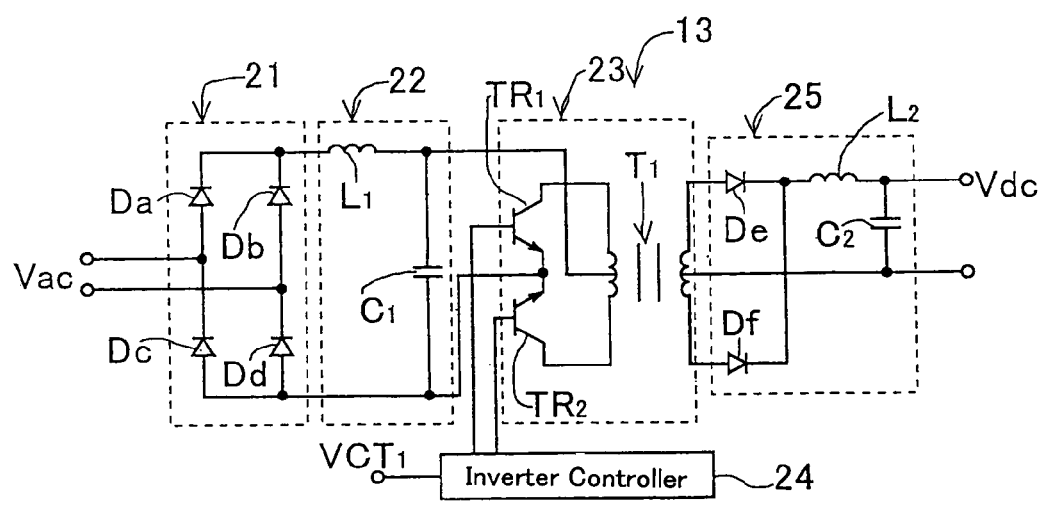
FIG. 7 is a circuit diagram which shows one example of the construction of the direct-current power supply used in the high-frequency power supply device of the present invention.
Figure 8:
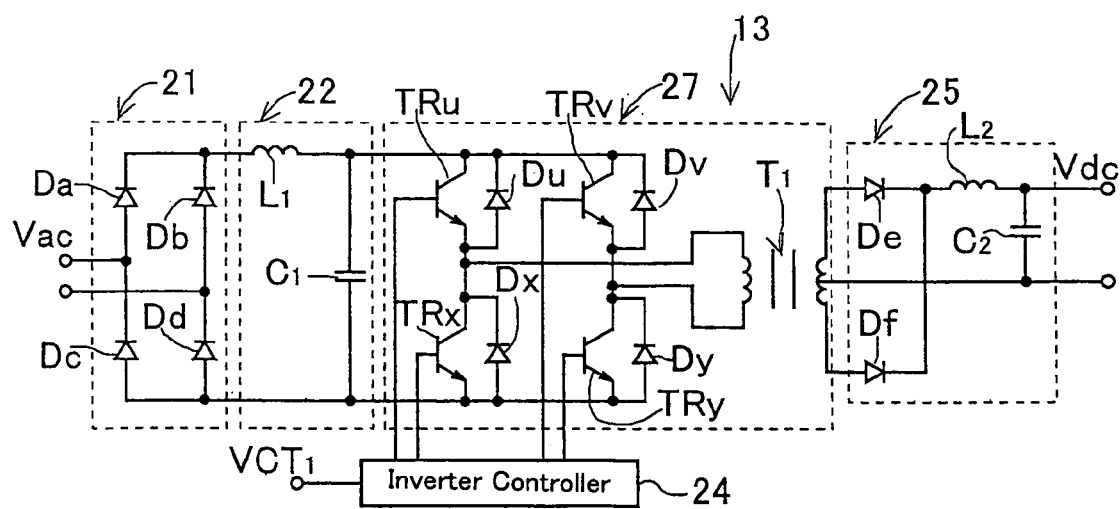
FIG. 8 is a circuit diagram which shows another example of the construction of the direct-current power supply used in the high-frequency power supply device of the present invention.
Figure 9:
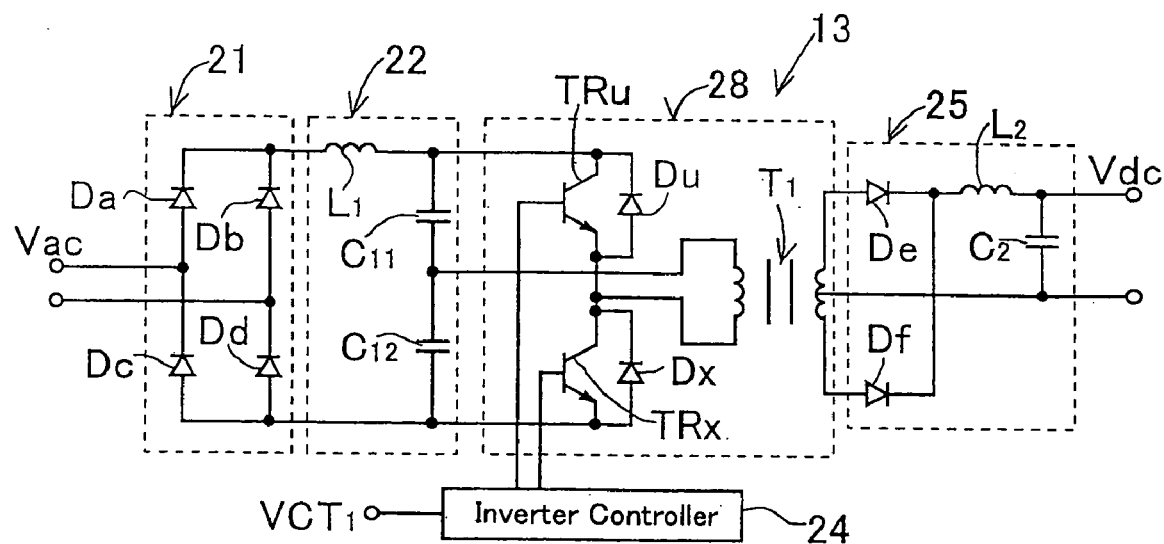
FIG. 9 is a circuit diagram which shows still another example of the direct-current power supply used in the high-frequency power supply device of the present invention.

FIGS. 7 through 9 show concrete examples of construction of direct-current power supplies 13 that can be used in the high-frequency power supply device of the present invention. Each of the direct-current power supplies 13 shown in these figures is constructed from a rectifier circuit which converts an alternating-current voltage Vac obtained from a commercial power supply into a direct-current voltage Vdc, an inverter circuit which converts the output of this rectifier circuit into an alternating-current voltage, and a converter circuit which converts the alternating-current output of this inverter circuit into a direct-current output.

FIG. 7 shows a direct-current power supply 13 that uses a push-pull type inverter circuit. This direct-current power supply 13 is constructed from a full-wave rectifier circuit 21 comprising a bridge circuit of diodes Da through Dd, a smoothing circuit 22 comprising a choke coil L1 and a smoothing capacitor C1, a push-pull type inverter circuit 23 comprising NPN transistors TR1 and TR2 and a transformer T1, an inverter controller 24 which performs on-off control of the transistors TR1 and TR2 so that the direct-current voltage supplied from the rectifier circuit 21 is converted into an alternating-current voltage, and a converter circuit 25 which comprises diodes De and Df, a choke coil L2 and a smoothing capacitor C2, and which converts the alternating-current output obtained from the inverter circuit 23 into a direct-current output.

In the direct-current power supply 13 shown in FIG. 7, the inverter controller 24 performs PWM control or PFM control of the transistors TR1 and TR2 in accordance with a control signal VCT1 that is supplied from the first controller 19', and outputs a PWM-controlled or PFM-controlled alternating-current voltage from the transformer T1. This alternating-current voltage is rectified by the diodes De and Df, smoothed by the choke coil L2 and capacitor C2, and supplied to the amplifier 12 as a direct-current voltage Vdc. Since the first controller 19' generates the control signal VCT1 so that the magnitude of the direct-current voltage Vdc that is detected by the direct-current output detector 17 is made equal to an indicated value Vdcc, the direct-current voltage Vdc that is output from the direct-current power supply 13 is controlled so that this voltage is equal to this indicated value Vdcc.

FIG. 8 shows a direct-current power supply 13 that uses a bridge type inverter circuit. This direct-current power supply 13 is constructed from the same rectifier circuit 21 and smoothing circuit 22 as those used in the direct-current power supply 13 shown in FIG. 7, a universally known bridge type inverter circuit 27 comprising transistors TRu, TRv, TRx and TRy, feedback diodes Du, Dv, Dx and Dy that are connected between the collectors and emitters of these transistors, and a transformer T1, an inverter controller 24 that controls the inverter circuit 27, and a converter circuit 25 which is the same as that used in the direct-current power supply 13 shown in FIG. 7.

In the direct-current power supply 13 shown in FIG. 8, the inverter controller 24 converts the direct-current voltage that is supplied from the rectifier circuit 21 into an alternating-current voltage by alternately placing the transistors located in the diagonal positions of the bridge of the inverter circuit 27 in an "on" state. Furthermore, the inverter controller 24 performs PWM control or PFM control of the transistors that are in an "on" state among the transistors that constitute the upper side of the bridge or the transistors that constitute the lower side of the bridge of the inverter circuit 27 in accordance with the control signal VCT1 that is supplied from the first controller 19', and outputs the resulting PWM-controlled or PFM-controlled alternating-current voltage from the transformer T1. This alternating-current voltage is rectified by the diodes De and Df, smoothed by the choke coil L2 and capacitor C2, and supplied to the amplifier 12 as a direct-current voltage Vdc. Since the first controller 19' generates the control signal VCT1 so that the magnitude of the direct-current voltage Vdc that is detected by the direct-current output detector 17 is made equal to an indicated value Vdcc, the direct-current voltage Vdc that is output from the direct-current power supply 13 is controlled so that this voltage is equal to this indicated value Vdcc.

Furthermore, FIG. 9 shows a direct-current power supply 13 that uses a half-bridge type inverter circuit. This direct-current power supply 13 is constructed in the same manner as the direct-current power supply 13 shown in FIG. 8, except for the fact that a smoothing circuit 22' comprising a choke coil L1 and capacitors C11 and C12 is used instead of the smoothing circuit 22 used in the direct-current power supply 13 shown in FIG. 8, and the fact that a half-bridge type inverter circuit 28 comprising transistors TRu and TRx, feedback diodes Du and Dx and a transformer T1 is used.

In the direct-current power supply 13 shown in FIG. 9, the inverter controller 24 performs PWM control or PFM control of the transistors in accordance with the control signal VCT1 that is supplied from the first controller 19', and outputs the resulting PWM-controlled or PFM-controlled alternating-current voltage from the transformer T1. This alternating-current voltage Vac is rectified by the diodes De and Df, smoothed by the choke coil L2 and capacitor C2, and supplied to the amplifier 12 as a direct-current voltage Vdc. Since the first controller 19' generates the control signal VCT1 so that the magnitude of the direct-current voltage Vdc that is detected by the direct-current output detector 17 is made equal to an indicated value Vdcc, the direct-current voltage Vdc that is output from the direct-current power supply 13 is controlled so that this voltage is equal to this indicated value Vdcc.

Figure 10:
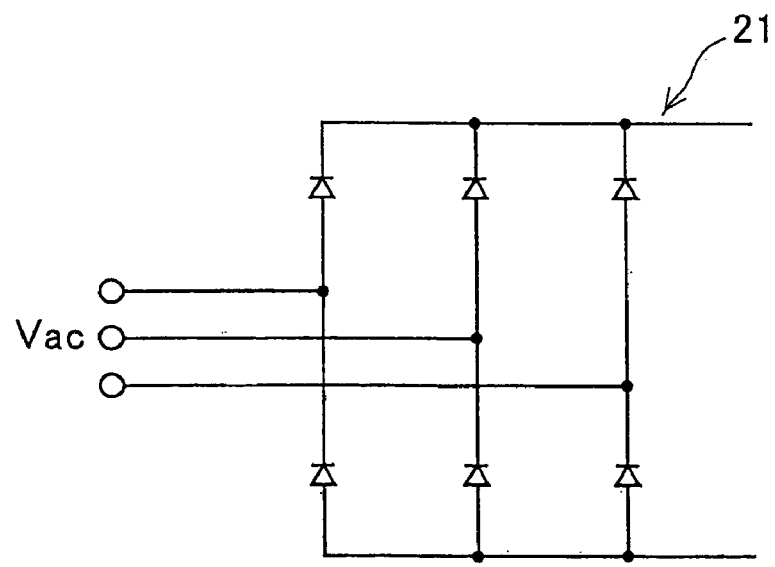
FIG. 10 is a circuit diagram which shows another example of construction of an input stage rectifier circuit that can be used in the direct-current power supplies shown in FIGS. 7 through 9.

In the examples shown in FIGS. 7 through 9, a single-phase alternating-current voltage Vac that is supplied from a commercial power supply is converted into a direct-current voltage Vdc. However, it would also be possible to construct the direct-current power supply 13 so that a three-phase alternating-current voltage Vac is converted into a direct-current voltage Vdc by replacing the rectifier circuit 21 shown in FIGS. 7 through 9 with the three-phase full-wave rectifier circuit 21' shown in FIG. 10.

Furthermore, in the examples shown in FIGS. 7 through 9, NPN transistors were used as the switching elements constituting the inverter circuit. However, it would also be possible to construct the inverter circuit using other power semiconductor elements, e.g., FETS, IGBTs or the like, as the switching elements.

(2) Example of Construction of First Control Part 19'

Figure 11:
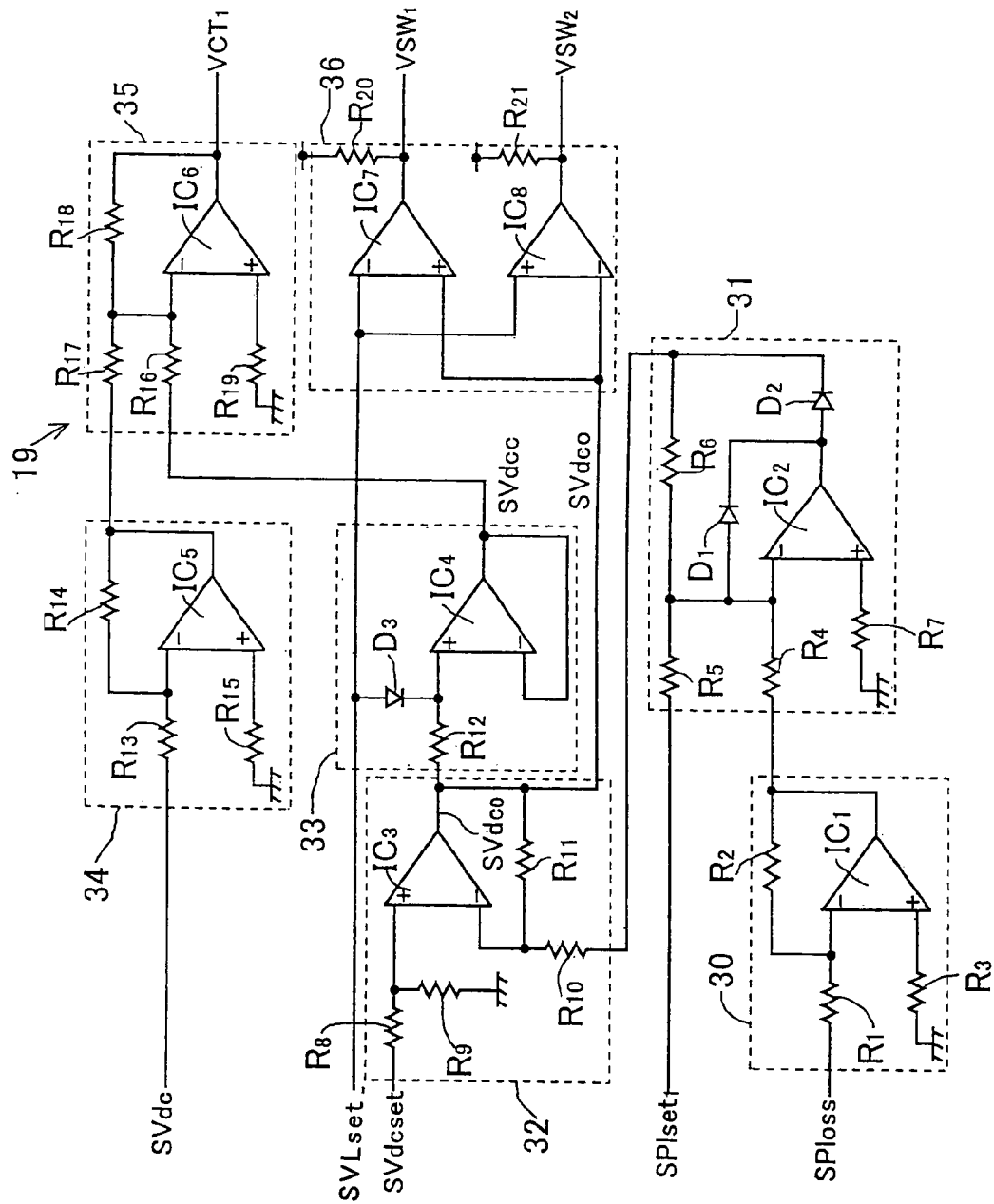
FIG. 11 is a circuit diagram which shows the circuit construction in a case where the first controller of a high-frequency power supply device constituting a second embodiment of the present invention is realized by means of a hardware circuit.

FIG. 11 shows an example in which the first controller 19' is constructed from a hardware circuit. In FIG. 11, the detection signal of the direct-current voltage Vdc shown in FIG. 6, the direct-current voltage set value Vdcset, the first loss set value Plset1, the calculated loss value Ploss and the like are all input into the first controller 19' in the form of voltage signals. In FIG. 11, the voltage signals that supply the direct-current voltage Vdc, direct-current voltage set value Vdcset, calculated loss value Ploss and the like are expressed by adding S in front of the respective symbols.

Specifically, in FIG. 11, SVdc is the direct-current voltage detection signal; this is a voltage signal that is proportional to the direct-current voltage Vdc that is output by the direct-current power supply 13. Furthermore, SVLset is a lower limit voltage set signal that gives the lower limit value VLset of the direct-current voltage Vdc, SVdcset is a direct-current voltage set signal that gives the set value Vdcset of the direct-current voltage Vdc, SPlset1 is a first loss set signal (voltage signal) that gives the first loss set value Plset1, and SPloss is a loss calculation signal that gives the loss value calculated by the loss calculator 18.

In the example shown in FIG. 11, a polarity reversing circuit 30 that reverses the polarity of the loss calculation signal SPloss from plus to minus is constructed from an operational amplifier IC1 and resistors R1 through R3, and a first error amplifier circuit 31 that inputs the first loss set signal SPlset1 and loss calculation signal SPloss whose polarity has been reversed, and that outputs a control signal so that the magnitude of the loss calculation signal SPloss is maintained at a value that is equal to the first loss set signal SPlset1, is constructed from an operational amplifier IC2, resistors R4 through R7, and diodes D1 and D2. The output signal of this first error amplifier circuit 31 is 0 V in cases where the magnitude of the loss calculation signal SPloss is equal to or less than the magnitude of the first loss set signal SPlset1, and shows a plus voltage value in cases where the magnitude of the loss calculation signal SPloss exceeds the magnitude of the first loss set signal SPlset1.

Furthermore, a subtraction circuit 32 which inputs the direct-current voltage set signal SVdcset an the output of the error amplifier circuit 31, and which outputs the voltage obtained by subtracting the output voltage of the error amplifier circuit 31 from the direct-current voltage set signal SVdcset as a target direct-current voltage signal SVdco which provides the target value Vdco of the direct-current output voltage Vdc that is required in order to limit the loss generated in the amplifier 12 to a value that is equal to or less than the first loss set value VLset is constructed from an operational amplifier IC3 and resistors R8 through R11.

Furthermore, a direct-current voltage indicated value signal detection circuit 33 which outputs a voltage signal that is equal to the target direct-current voltage SVdco (that is output from the subtraction circuit 32) as a direct-current voltage indicated value signal SVdcc indicating the indicated value Vdcc of the direct-current voltage Vdc that is output from the direct-current power supply 13 in cases where the target direct-current voltage signal SVdco that is output from the subtraction circuit 32 is equal to or greater than the lower limit voltage set signal SVdcL that gives the lower limit value VLset of the direct-current voltage Vdc, and which outputs the lower limit voltage set signal SVLset as the direct-current voltage indicated value signal SVdcc that indicates the indicated value Vdcc of the direct-current voltage that is output from the direct-current power supply 13 in cases where the target direct-current voltage signal SVdco that is output from the subtraction circuit 32 is equal to or less than the lower limit voltage set signal SVLset, is constructed from an operational amplifier 1C4, a resistor R12 and a diode D3.

Furthermore, a polarity reversing circuit 34 which reverses the polarity of the direct-current voltage detection signal SVdc from plus to minus is constructed from an operational amplifier IC5 and resistors R13 through R15, and a second error amplifier circuit 35 which inputs the direct-current voltage indicated value signal SVdcc and the output of the polarity reversing circuit 34 and outputs a control signal VCT1 so that the magnitude of the direct-current voltage detection signal SVdc is maintained at a value that is equal to the magnitude of the direct-current voltage indicated value signal SVdcc is constructed from an operational amplifier IC6 and resistors R16 through R19.

The inverter controller 24 of the direct-current power supply 13 inputs the control signal VCT1, and performs on-off control of the transistors of the inverter circuit by means of PWM control or PFM control, so that the value of the output voltage Vdc of the direct-current power supply 13 is caused to coincide with the indicated value Vdcc of the direct-current voltage Vdc that is given by the direct-current voltage indicated value signal SVdcc.

Furthermore, in FIG. 11, IC7 and IC8 are comparators, and a comparator circuit 36 which compares the lower limit voltage set signal SVLset and the target direct-current voltage signal SVdco that is supplied from the subtraction circuit 32, and outputs a first control signal VSW1 and second control signal VSW2 with different levels from the comparators IC7 and IC8 in accordance with the magnitude relationship of these signals, is constructed from these comparators and resistors R20 and R21.

In cases where the target direct-current voltage signal SVdco is greater than the lower limit voltage set signal SVLset (i.e., in cases where the target value Vdcc of the output voltage Vdc of the direct-current power supply 13 that is required in order to limit the loss that is generated in the amplifier 12 to a value that is equal to or less than the first loss set value Ploss1 is equal to or greater than the lower limit value VLset of the direct-current power supply 13), the comparator circuit 36 sets the first control signal VSW1 and second control signal VSW2 at the high level and zero level, respectively, and in cases where the target direct-current voltage signal SVdco is equal to or less than the lower limit voltage set signal SVLset (i.e., in cases where the target value Vdcc of the output voltage Vdc of the direct-current power supply 13 that is required in order to limit the loss that is generated in the amplifier 12 to a value that is equal to or less than the first loss set value PLoss1 is equal to or less than lower limit value VLset of the direct-current power supply 13), the comparator circuit 36 sets the first control signal VSW1 and second control signal VSW2 at the zero level and high level, respectively. These control signals are supplied to the second controller 20'. The first control signal VSW1 and second control signal VSW2 are used in order to supply to the second controller 20' information indicating whether the target value Vdcc of the direct-current power voltage Vdc is greater than the lower limit value VLset or equal to or less than the lower limit value VLset.

(3) Example of Construction of Second Control Part 20'

Figure 12:
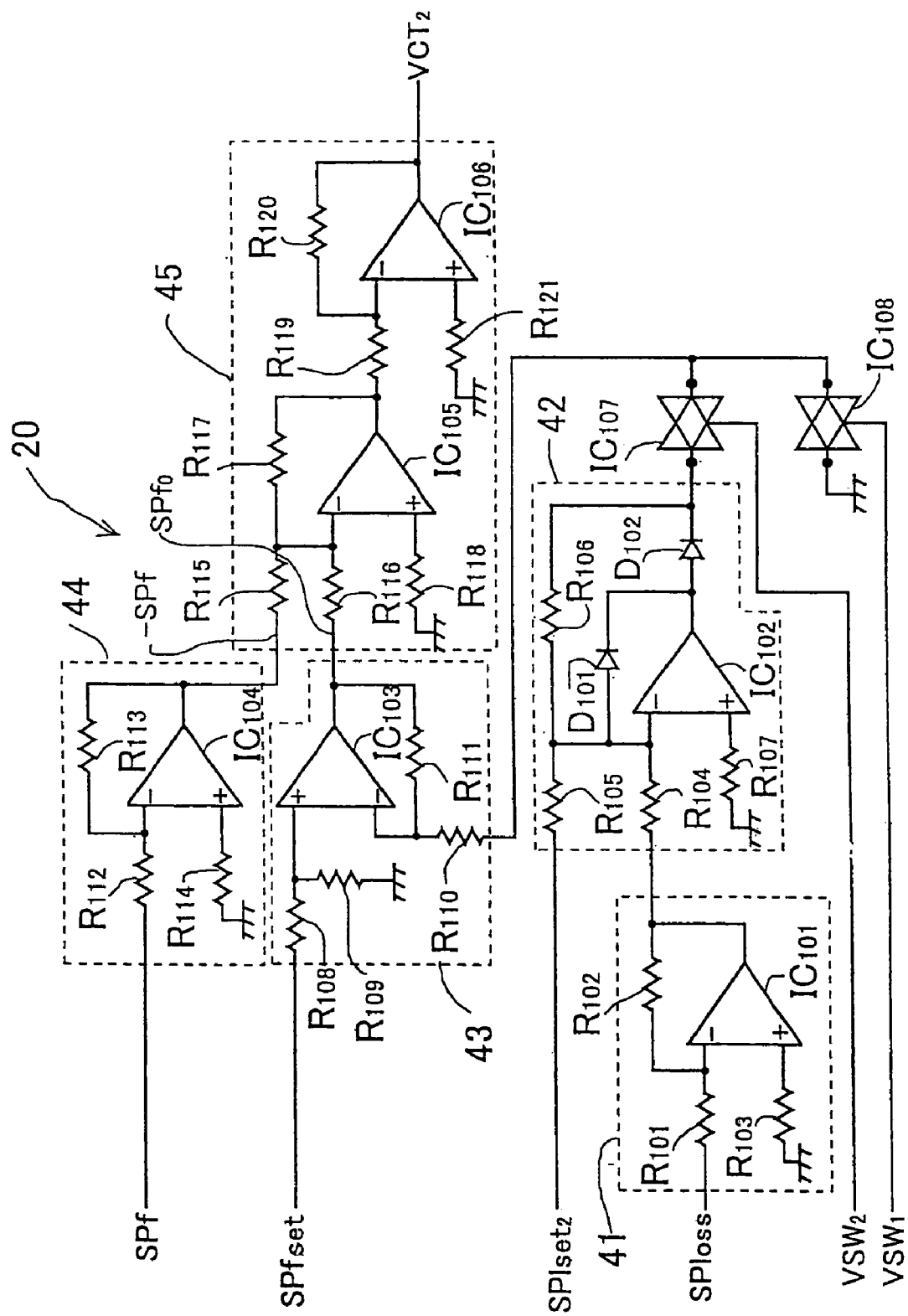
FIG. 12 is a circuit diagram which shows the circuit construction in a case where the second controller of a high-frequency power supply device constituting a second embodiment of the present invention is realized by means of a hardware circuit.

FIG. 12 shows an example of the construction of the second controller 20'. In FIG. 12, SPf is a high-frequency output detection signal that is obtained from the high-frequency output detector 14, SPfset is a high-frequency output set signal that gives the set value Pfset of the high-frequency output Pf, SPlset2 is a second loss set signal that gives the second loss set value Plset2, and SPloss is a loss calculation signal indicating the loss value that is calculated by the loss calculator 18.

In the second controller 20' shown in FIG. 12, a polarity reversing circuit 41 that converts the polarity of the loss calculation signal SPloss from plus to minus is constructed from an operational amplifier IC101 and resistors R101 through R103, and an error amplifier circuit 42 which inputs the output of the polarity reversing circuit 41 and the second loss set signal SPlset2 and outputs a control signal so that the magnitude of the loss calculation signal SPloss is maintained at a value that is equal to the magnitude of the second loss set signal SPlset2 is constructed from an operational amplifier IC102, resistors R104 through R107, and diodes D101 and D102.

The output of the error amplifier circuit 42 is 0 V in cases where the magnitude of the loss calculation signal SPloss is smaller than the magnitude of the second loss set signal SPlset2, and shows a plus voltage value in cases where the magnitude of the loss calculation signal SPloss exceeds the magnitude of the second loss set signal SPlset2.

IC107 and IC108 are respectively first and second analog switches, and these analog switches are placed in an "on" state when high-level control signals are supplied to the respective control terminals.

In cases where the target value direct-current voltage signal SVdco is equal to or less than the lower limit voltage set signal SVLset (in cases where the target value of the output voltage of the direct-current power supply 13 that is required in order to limit the loss that is generated in the amplifier 12 to a value that is equal to or less than the first loss set value Ploss1 is equal to or less than the lower limit value VLset of the direct-current power supply 13), i.e., in cases where the first control signal VSW1 and second control signal VSW2 provided from the first controller 19' are respectively at the zero level and high level, the first analog switch IC107 is placed in an "on" state, and the second analog switch IC108 is placed in an "off" state.

On the other hand, in cases where the target value direct-current voltage signal SVdco is greater than the lower limit voltage set signal SVLset (in cases where the target value Vdcc of the output voltage Vdc of the direct-current power supply 13 that is required in order to limit the loss that is generated in the amplifier 12 to a value that is equal to or less than the first loss set value Ploss1 is greater than the lower limit value VLset of the direct-current power supply 13), i.e., in cases where the first control signal VSW1 and second control signal VSW2 provided from the first controller 19' are respectively at the high level and zero level, the first analog switch IC107 is placed in an "off" state, and the second analog switch IC108 is placed in an "on" state.

Furthermore, in the second controller 20' shown in FIG. 12, a target high-frequency output signal generating circuit 43 which inputs the set signal SPfset of the high-frequency output (forward power) that is output from the amplifier 12 and the output of the analog switch IC107 or IC108, and which outputs a signal obtained by subtracting the output signal of the analog switch IC107 or IC108 from the high-frequency output set signal SPfset as a target high-frequency output signal SPfo, is constructed from an operational amplifier IC103 and resistors R108 through R111.

In cases where the magnitude of the loss calculation signal SPloss (i.e., the loss that is generated in the amplifier 12) is equal to or less than the magnitude of the second loss set signal SPlset2, the target direct-current voltage signal SVdco is equal to or greater than the lower limit voltage set signal SVLset, and the first control signal VSW1 and second control signal VSW2 that are supplied from the first controller 19' are respectively at the high level and zero level. Accordingly, the analog switch IC108 is placed in an "on" state, and the analog switch IC107 is placed in an "off" state. In this case, the target high-frequency output signal generating circuit 43 outputs a voltage signal that is equal to the high-frequency output set signal SPfset as the target high-frequency output signal SPfo.

On the other hand, in cases where the magnitude of the loss calculation signal SPloss is greater than the magnitude of the second loss set signal SPlset2, the target direct-current voltage signal SVdco is lower than the lower limit voltage set signal SVLset, and the first control signal VSW1 and second control signal VSW2 that are supplied from the first controller 19' are respectively at the zero level and high level. Accordingly, the first analog switch IC107 is placed in an "on" state, and the second analog switch IC108 is placed in an "off" state. In this case, the target high-frequency output signal generating circuit 43 outputs a signal that is obtained by subtracting the output of the error amplifier circuit 42 from the high-frequency output set signal SPfset as the target high-frequency output signal SPfo.

Furthermore, a polarity reversing circuit 44 which reverses the polarity of the high-frequency output detection signal SPf that is obtained from the high-frequency output detector 14 from plus to minus is constructed from an operational amplifier IC104 and resistors R112 through R114, and an error amplifier circuit 45 which inputs the output of the target high-frequency output signal generating circuit 43 and the polarity reversing circuit 44, and which outputs a control signal VCT2 so that the magnitude of the high-frequency output detection signal SPf is maintained at a value that is equal to the magnitude of the target high-frequency output signal SPfo, is constructed from operational amplifiers IC105 and IC106 and resistors R115 through R121. The value of the control signal VCT2 corresponds to a coefficient by which the magnitude of the signal that is input into the amplifiers of the amplifier 12 is multiplied in order to reduce the difference between the target high-frequency output signal SPfo and the high-frequency output detection signal SPf to zero. By multiplying the output of the oscillator 11 by the control signal VCT2 or multiplying the input signal of the amplifiers inside the amplifier 12 by the control signal VCT2, it is possible to control the output of the amplifier 12 so that the difference between the target high-frequency output signal SPfo and the high-frequency output detection signal SPf is reduced to zero.

Figure 13:
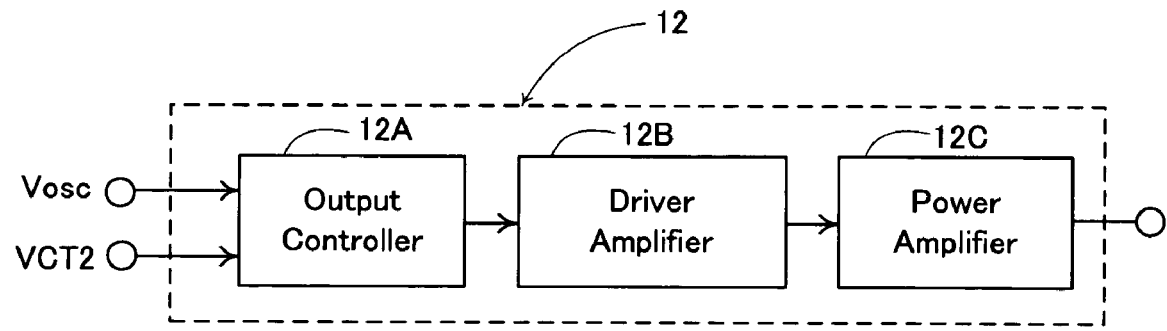
FIG. 13 is a block diagram showing an example of the construction of the amplifier of the high-frequency power supply devices of the first and second embodiments.

In cases where the second controller 20' is constructed as described above, the amplifier 12 shown in FIG. 6 is constructed (for example) from an output controller 12A, a driver amplifier 12B and a power amplifier 12C as shown in FIG. 13, and the control signal VCT2 obtained from the error amplifier circuit 45 of the second controller 20' is input into the output controller 12A along with the output Vosc of the oscillator 11.

The output controller 12A comprises a multiplier, a mixer circuit using a double-balanced mixer or dual gate FET and the like; by multiplying the signal Vosc with a specified frequency that is output by the oscillator 11 and the control signal VCT2, this output controller 12A adjusts the magnitude of the signal that is input into the driver amplifier 12B so that the difference between the target high-frequency output signal SPfo and the high-frequency output detection signal SPf is reduced to zero. The signal whose magnitude has thus been adjusted by the control signal is amplified by the driver amplifier 12B, and the output of the driver amplifier 12B is subjected to power amplification by the power amplifier 12C, so that this output is supplied to the load 16 as a high-frequency output that is equal to the target value given by the target high-frequency output signal SPfo.

(4) Operation in a Case Where the First and Second Control Parts 19' and 20' Are Constructed as Shown in FIGS. 11 and 12

The operations in cases where the first controller 19' and second controller 20' are constructed as shown in FIG. 11 and FIG. 12 are as follows.

In cases where the calculated loss value Ploss calculated by the loss calculator 18 shown in FIG. 6 is equal to or less than the first loss set value Plset1, the output signal of the first error amplifier circuit 31 shown in FIG. 11 is 0 V; accordingly, the subtraction circuit 32 outputs a voltage signal with a magnitude that is equal to the direct-current voltage set signal SVdcset as the target direct-current voltage signal SVdco. Assuming that this target direct-current voltage signal SVdco is greater than the lower limit voltage set signal SVLset of the direct-current voltage Vdc, the direct-current voltage indicated value signal output circuit 33 outputs a voltage signal that is equal to the direct-current voltage set signal SVLdcset as the direct-current voltage indicated value signal SVdcc, and the error amplifier circuit 35 outputs a control signal VCT1 so that the magnitude of the direct-current voltage detection signal SVdc is maintained at a value that is equal to the magnitude of the direct-current voltage set signal SVdcset. The inverter controller 24 of the direct-current power supply 13 adjusts the mean value of the alternating-current voltage that is supplied to the converter circuit 25 in accordance with the magnitude of this control signal; accordingly, the output voltage Vdc of the direct-current power supply 13 is maintained at a voltage Vdcc that is set by the set direct-current voltage SVdcset.

On the other hand, in cases where the calculated loss value Ploss that is calculated by the loss calculator 18 exceeds the first loss set value Plset1, the first error amplifier circuit 31 shown in FIG. 11 outputs a control signal so that the magnitude of the loss calculation signal SPloss is maintained at a value that is equal to the magnitude of the first loss set signal SPlset1. The subtraction circuit 32 outputs a voltage signal obtained by subtracting the control signal output by the error amplifier circuit 31 from the direct-current voltage set signal SVdcset as a target direct-current voltage signal SVdco that gives the target value Vdcc of the direct-current power voltage Vdc. In this case, assuming that the magnitude of the target direct-current voltage signal SVdco is greater than the lower limit voltage set signal SVLset of the direct-current voltage Vdc, the direct-current voltage indicated value signal output circuit 33 outputs a voltage signal that is equal to the target direct-current voltage signal SVdco as the direct-current voltage indicated value signal SVdcc, and the error amplifier circuit 35 outputs a control signal VCT1 so that the magnitude of the direct-current voltage detection signal SVdc is maintained at a value that is equal to the magnitude of the target direct-current voltage signal SVdco. The inverter controller 24 of the direct-current power supply 13 adjusts the mean value of the alternating-current voltage that is supplied to the converter circuit 25 in accordance with the magnitude of this control signal; accordingly, the output voltage Vdc of the direct-current power supply 13 is adjusted to a value that is lower by a voltage corresponding to the output of the error amplifier circuit 31 than the voltage set by direct-current voltage set signal SVdcset.

As a result of control that lowers the output voltage Vdc of the direct-current power supply 13 thus being performed with an increase in the loss value that is calculated by the loss calculator 18, the direct-current voltage indicated value signal output section 33 outputs the lower limit voltage set signal SVLset as the direct-current voltage indicated value signal SVdcc in cases where the output voltage Vdc of the direct-current power supply 13 falls below the lower limit value VLset. Accordingly, the output voltage Vdc of the direct-current power supply 13 is maintained by the error amplifier circuit 35 at a lower limit value VLset that is set by the lower limit voltage set signal SVLset.

As was described above, in cases where the calculated loss value Ploss does not exceed the first loss set value Plset1, the first controller 19' shown in FIG. 11 controls the output voltage Vdc of the direct-current power supply 13 so that this voltage is maintained at a direct-current voltage set value Vdcset that is set at an appropriate value. On the other hand, in cases where the loss Ploss calculated by the loss calculator 18 exceeds the first loss set value Plset1, the first controller 19' performs a control action so that the output voltage of the direct-current power supply 13 is lowered in a range that does not fall below the lower limit value VLset, thus lowering the output of the amplifier 12 so that the calculated loss value (loss generated in the amplifier) Ploss is reduced.

Furthermore, in the second controller 20' shown in FIG. 12, in cases where the target value Vdco of the output of the direct-current power supply 13 is greater than the lower limit value VLset of the direct-current voltage Vdc, the analog switch IC108 is place in an "on" state, and the analog switch IC107 is placed in an "off" state; accordingly, the target high-frequency output signal generating circuit 43 outputs a voltage signal that is equal to the high-frequency output set signal SPfset as the target high-frequency output signal SPfo. In this case, the error amplifier circuit 45 outputs a voltage signal with a magnitude corresponding to the value of the coefficient by which the input signal of the amplifier of the amplifier 12 is multiplied (in order to reduce the deviation between the target high-frequency output signal SPfo (equal to the high-frequency output set signal SPfset) and the high-frequency output detection signal SPf to zero) as the control signal VCT2, and the output of the amplifier 12 is adjusted by this control signal; accordingly, the high-frequency output Pf that is supplied to the load 16 from the amplifier 12 is adjusted so that this output approaches the magnitude that is set by the high-frequency output set signal SPfset.

On the other hand, in cases where the target value Vdco of the output of the direct-current power supply 13 is equal to or less than the lower limit value VLset, the analog switch IC107 is placed in an "on" state, and the analog switch IC108 is placed in an "off" state; accordingly, the target high-frequency output signal generating circuit 43 outputs a signal obtained by subtracting the output of the error amplifier circuit 42 from the high-frequency output set signal SPfset as the target high-frequency output signal SPfo. As a result, the target value Pfo of the high-frequency output Pf is altered so that the loss generated in the amplifier 12 is limited to the second loss set value Plset2. The error amplifier circuit 45 outputs a value with a magnitude corresponding to the value of the coefficient by which the input signal of the amplifier of the amplifier 12 is multiplied (in order to reduce the deviation between this target high-frequency output signal SPfo and the high-frequency output detection signal SPf to zero) as the control signal VCT2, and the output of the amplifier 12 is adjusted by this control signal. Accordingly, the output of the amplifier 12 is adjusted so that the loss generated in the amplifier 12 is made equal to the second loss set value Ploss2.

As was described above, in cases where the high-frequency output Pf of the amplifier 12 that is detected by the high-frequency output detector 14 deviates from the high-frequency output set value Pfset, the second controller 20' shown in FIG. 12 controls the output of the amplifier 12 so that the high-frequency output Pf returns to the high-frequency output set value Pfset if the output voltage Vdc of the direct-current power supply 13 is greater than the lower limit value VLset. On the other hand, in cases where the output voltage Vdc of the direct-current power supply 13 is equal to or less than the lower limit value VLset, the second controller 20' controls the output of the amplifier 12 so that the calculated loss value Ploss is made equal to a second loss set value Plset2, which is set at a value that is equal to the first loss set value Plset1 or slightly greater than this first loss set value Plset1.

(5) Examples of Construction of First Control Part 19 and Second Control Part 20

The first controller 19 shown in FIG. 1 can be constructed from a circuit in which the comparator circuit 36 is removed from the circuit shown in FIG. 11.

Furthermore, the second controller 20 installed in the high-frequency power supply device shown in FIG. 1 can be constructed from the target high-frequency output signal generating circuit 43, polarity reversing circuit 44 and error amplifier circuit 45 shown in FIG. 12.

(6) Other Example of Construction of First Control Part 19'

Figure 14:
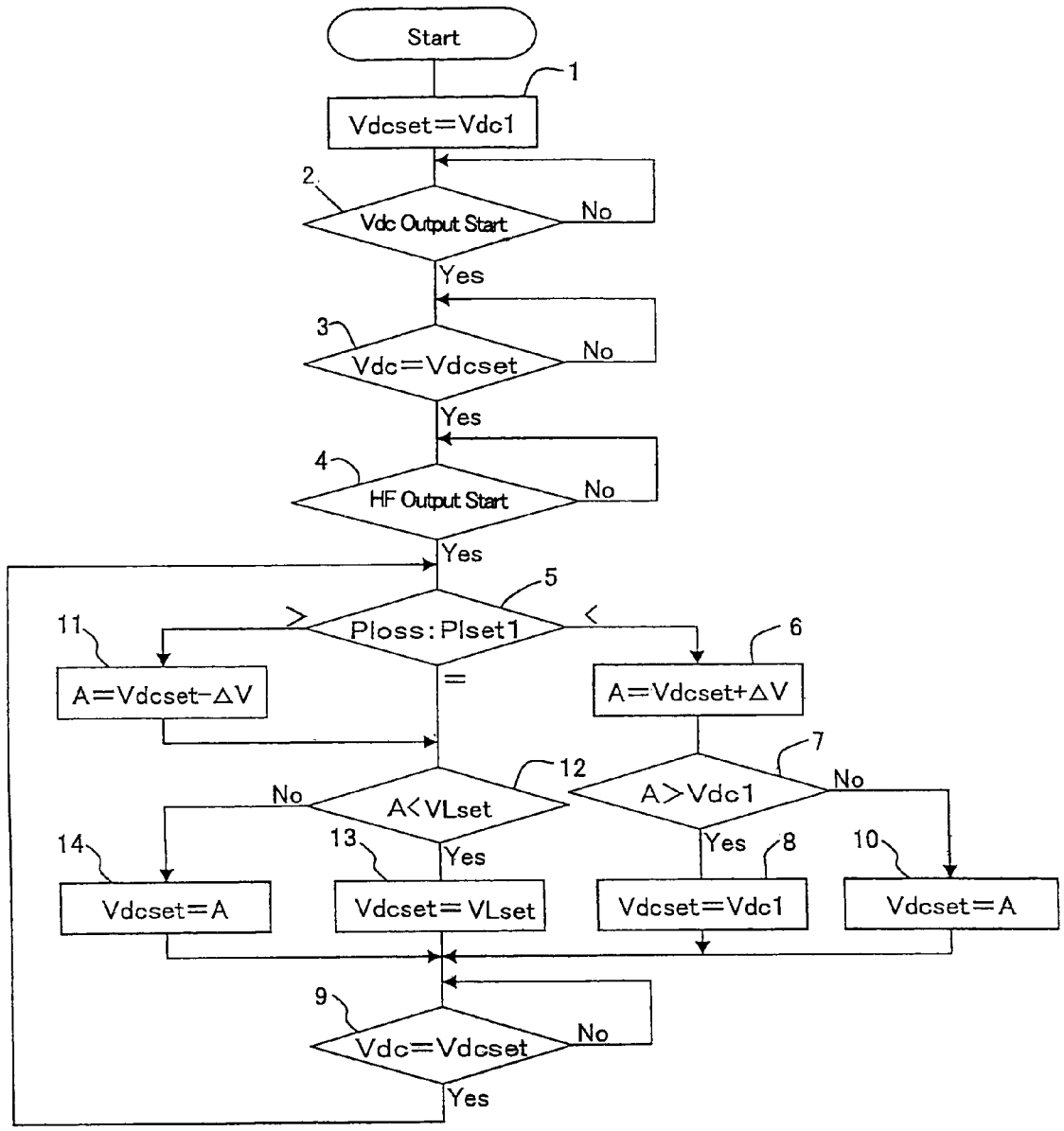
FIG. 14 is a flow chart showing the algorithms of a program used to cause execution by a computer in a case where the first controller of the high-frequency power supply device of the second embodiment is realized by means of software.

The first controller 19' shown in FIG. 6 can also be constructed in terms of software. FIG. 14 is a flow chart of the algorithm of a program that is executed by a computer in order to realize the first controller 19'. In FIG. 14, Vdc indicates the output voltage (direct-current power voltage) of the direct-current power supply 13, and Vdcset indicates the set value of the output voltage Vdc of the direct-current power supply 13 (direct-current voltage set value). Furthermore, VLset indicates the lower limit value of the direct-current power voltage Vdc, and Ploss indicates the calculated loss value. Moreover, Plset1 indicates the first loss set value, Vdc1 indicates the initial value of the output voltage of the direct-current power supply 13 under ordinary conditions, and ΔV indicates a very small voltage set value which is a fixed value.

In the case of the algorithm shown in FIG. 14, processing which is used to start the direct-current power supply 13 with the direct-current voltage set value Vdcset set as the initial value Vdc1 is first performed in step 1. In step 2, the processing waits for the start of the output of the direct-current power voltage Vdc by the direct-current power supply 13. When it is judged that the output of the direct-current power voltage Vdc has been started, the processing proceeds to step 3, and waits for the direct-current power voltage Vdc to become equal to the direct-current voltage set value Vdcset. When it is judged that the direct-current power voltage Vdc has become equal to the direct-current voltage set value Vdcset, the processing proceeds to step 4, and waits for the amplifier 12 to start the generation of a high-frequency output.

When it is judged in step 4 that the high-frequency output has been started, the processing proceeds to step 5, and the calculated loss value Ploss and first loss set value Plset1 are compared. Initially, the calculated loss value Ploss is smaller than the first loss set value Plset1; accordingly, the processing next proceeds to step 6, and calculates an updated value A (=Vdcset+ΔV) of the set value Vdcset of the direct-current power voltage Vdc. In step 7, a judgement is made as to whether or not the updated value A of the set value Vdcset of the direct-current power voltage Vdcset is higher than the initial value Vdc1. When step 7 is initially performed at the time of starting, the updated value A is higher than the initial value Vdc1; accordingly, the processing proceeds to step 8. In step 8, processing which is used to raise the output voltage Vdc of the direct-current power supply 13 toward the direct-current voltage set value Vdcset is performed with the initial value Vdc1 taken as the direct-current voltage set value Vdcset. Subsequently, in step 9, the processing waits for the output voltage Vdc of the direct-current power supply 13 to become equal to the direct-current voltage set value Vdcset. When it is judged that the output voltage Vdc of the direct-current power supply 13 has become equal to the direct-current voltage set value Vdcset (=Vdc1), the processing returns to step 5, and again compares the calculated loss value Ploss and the first loss set value Plset1.

In cases where it is judged in step 7 that the updated value A of the direct-current voltage set value Vdcset is equal to or less than the initial value Vdc1, the processing proceeds to step 10, and processing is performed that varies the output voltage Vdc of the direct-current power supply 13 toward the direct-current voltage set value Vdcset, with the update value A taken as the direct-current voltage set value Vdcset. The processing then waits for the direct-current power voltage Vdc to become equal to the direct-current voltage set value Vdcset in step 9. When it is judge in step 9 that the direct-current power voltage Vdc has become equal to the direct-current voltage set value Vdcset (=Vdc1), the processing returns to step 5, and again compares the calculated loss value Ploss and first loss set value Plset1.

When it is judged that the calculated loss value Ploss has exceeded the first loss set value Plset1 as a result of the comparison of the calculated loss value Ploss with the first loss set value Plset1 in step 5, the processing proceeds to step 11, and the updated value A of the direct-current voltage set value Vdcset (=Vdcset−ΔV) is calculated. Then, the processing proceeds to step 12, and a judgement is made as to whether or not the updated value A of the direct-current voltage set value Vdcset is lower than the set value VLset of the lower limit value. In cases where it is judged as a result that A is lower than the set value VLset of the lower limit value, the processing proceeds to step 13, and processing which varies the output voltage Vdc of the direct-current power supply 13 toward the direct-current voltage set value Vdcset is performed with the set value VLset of the lower limit value taken as the direct-current voltage set value Vdcset. The processing then proceeds to step 9. Furthermore, in cases where it is judged in step 12 that the updated value A is higher than the lower limit value VLset, the processing proceeds to step 14, and processing that varies the output voltage Vdc of the direct-current power supply 13 toward to the set direct-current voltage Vdcset is performed with the updated value A taken as the direct-current voltage set value Vdcset. The processing then proceeds to step 9. In step 9, the processing waits for the direct-current power voltage Vdc to become equal to the direct-current voltage set value Vdcset, and when the direct-current power voltage Vdc has become equal to the direct-current voltage set value Vdcset, the processing returns to step 5.

When it is judged that the calculated loss value Ploss is equal to the first loss set value Plset1 as a result of the comparison of the calculated loss value Ploss with the first loss set value Plset1 in step 5, the processing proceeds to step 12, where a judgement is made as to whether or not the updated value A is lower than the lower limit value VLset, without calculating the updated value A of the direct-current voltage set value.

In the case of the algorithm shown in FIG. 14, in cases where the calculated loss value Ploss is lower than the first loss set value Plset1, steps 5, 6, 7, 8 and 9 are repeated until the calculated loss value Ploss becomes equal to the first loss set value Plset1. Accordingly, the output voltage Vdc of the direct-current power supply 13 is raised until the calculated loss value Ploss becomes equal to the first loss set value Plset1, and this elevation of the output voltage Vdc is stopped when the calculated loss value Ploss becomes equal to the first loss set value Plset1. Furthermore, in cases where the calculated loss value Ploss exceeds the first loss set value Plset1, steps 5, 11, 12, 14 and 9 are repeated, so that the direct-current power voltage Vdc is lowered until the calculated loss value Ploss becomes equal to the first loss set value Plset1. In cases where the direct-current power voltage Vdc is lower than the set value VLset of the lower limit value, step 13 is executed, so that the direct-current power voltage Vdc is maintained at the lower limit value VLset; accordingly, destabilization of the operation of the amplifier 12 as a result of the direct-current power voltage Vdc falling below the lower limit value VLset is prevented.

(7) Other Example of Construction of Second Control Part 20'

Figure 15:
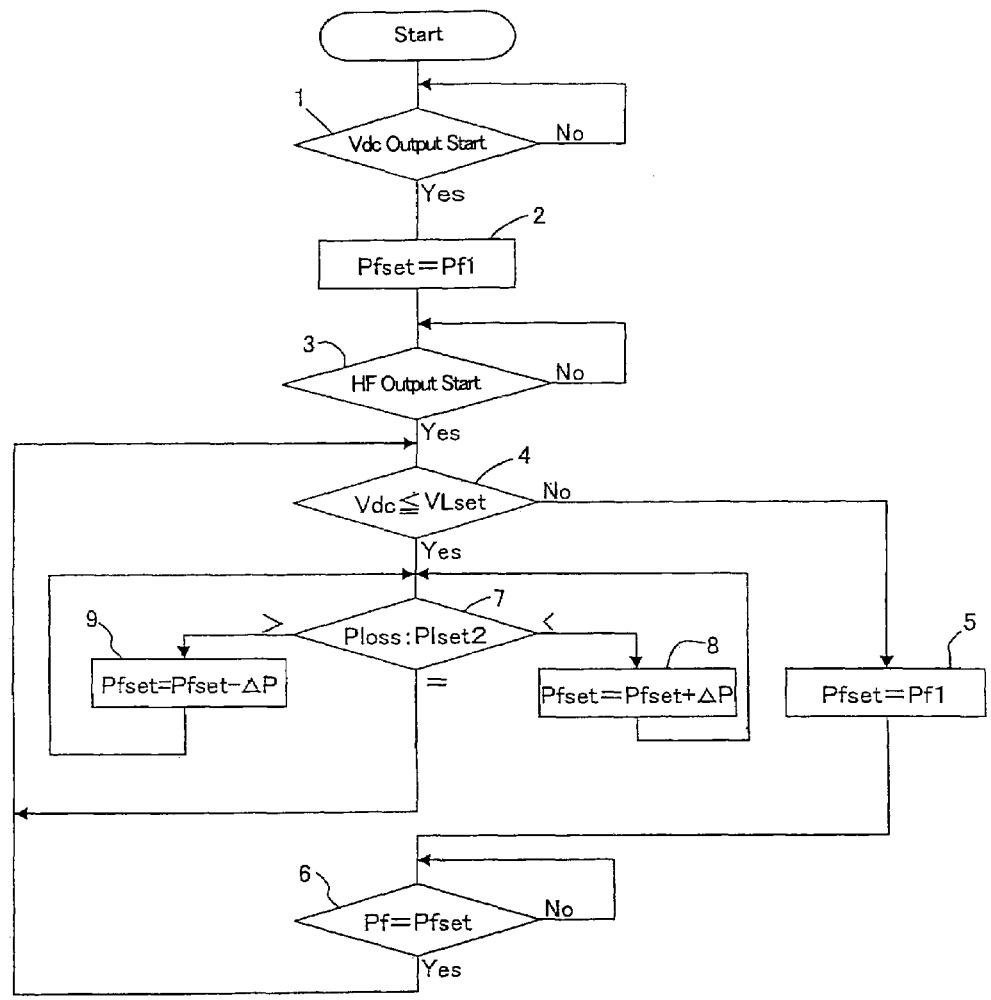
FIG. 15 is a flow chart showing the algorithms of a program used to cause execution by a computer in a case where the second controller of the high-frequency power supply device of the second embodiment is realized by means of software.

The second controller 20' shown in FIG. 6 can also be constructed in terms of software. FIG. 15 is a flow chart of the algorithm of a program that is executed by a computer in order to realize the second controller 20'. In FIG. 15, Pfset indicates the set value of the high-frequency power (forward power) that is output by the amplifier 12, and Pf1 indicates the set value of the high-frequency power that is supplied from the outside via a keyboard or the like. Furthermore, Pf indicates the high-frequency power output value that is detected by the high-frequency output detector 14, and Vdc indicates the direct-current power voltage that is detected by the direct-current output detector 17. Moreover, VLset indicates the lower limit value of the direct-current power voltage Vdc, Ploss indicates the calculated loss value, Plset2 indicates the second loss set value, and ΔP indicates a very small power set value which is a fixed value.

In the case of the algorithm shown in FIG. 15, a judgement as to whether or not the output of the direct-current power voltage Vdc has been started is made in step 1; in cases where the output of the direct-current power voltage Vdc has been started, the processing processed to step 2, and the high-frequency power set input value Pf1 is taken as the high-frequency power set value Pfset. Next, in step 3, a judgement is made as to whether or not the output of the high-frequency power Pf has been started by the amplifier 12. In cases where the output of the high-frequency power Pf has been started, the processing proceeds to step 4. In step 4, a judgement is made as to whether or not the direct-current power voltage Vdc is equal to or less than the lower limit value VLset, and in cases where the direct-current power voltage Vdc is not equal to or less than the lower limit voltage VLset, the processing proceeds to step 5, and processing that is used to make the output of the amplifier 12 equal to the high-frequency power set value Pfset is performed with the high-frequency power set input value Pf1 taken as the high-frequency power set value Pfset. Next, in step 6, the processing waits for the high-frequency power output value Pf to become equal to the high-frequency power set value Pfset, and when it is judged that the high-frequency power output value Pf has become equal to the high-frequency power set value Pfset, the processing returns to step 4.

In cases where it is judged in step 4 that the direct-current power voltage Vdc is equal to or less than the lower limit value VLset, the processing proceeds to step 7, and the calculated loss value Ploss is compared with the second loss set value Plset2. In cases where it is judged as a result that the calculated loss value Ploss is smaller than the second loss set value. Plset2, the processing proceeds to step 8, at which the output of the amplifier 12 is made equal to a high-frequency output set value (Pfset+ΔP), which is obtained by adding a small power set value ΔP to the high-frequency power set value Pfset. Thereafter, the processing returns to step 7. When it is judged in step 7 that the calculated loss value Ploss has become equal to the second loss set value Plset2 as a result of the repetition of steps 7 and 8, the processing returns to step 4.

In cases where it is judged in step 7 that the calculated loss value Ploss is greater than the second loss set value Plset2, the processing proceeds to step 9, and processing that is used to make the output of the amplifier 12 equal to the high-frequency power set value Pfset is performed with a value (Pfset−ΔP) obtained by subtracting a very small power set value ΔP from the high-frequency power set value Pfset taken as the new high-frequency power set value Pfset, after which the processing returns to step 7. When it is judged in step 7 that the calculated loss value Ploss has become equal to the second loss set value Plset2 as a result of the repetition of steps 7 and 9, the processing returns to step 4.

In the case of the algorithm shown in FIG. 15, as was described above, the high-frequency output Pf of the amplifier 12 is controlled so that the high-frequency power Pf that is output by the amplifier 12 becomes equal to the high-frequency power set input value Pf1 in cases where the direct-current power voltage Vdc is greater than the lower limit value VLset. On the other hand, in cases where the direct-current power voltage Vdc is equal to or less than the lower limit value VLset, the output of the amplifier 12 is controlled so that the calculated loss value Ploss becomes equal to the second loss set value PLset2.

In the example, the system is devised so that in cases where the direct-current power voltage Vdc is equal to or greater than the lower limit value VLset, the high-frequency output Pf of the amplifier 12 is controlled so that the high-frequency output Pf of the amplifier 12 that is detected by the high-frequency output detector 14 is caused to approach the high-frequency output set value Pfset. However, it would also be possible to devise the system so that the output of the oscillator 11 is controlled instead of controlling the high-frequency output Pf of the amplifier 12.

In the embodiment shown in FIG. 1, the loss Ploss that is generated in the amplifier 12 is calculated by adding the reflected power Pr to a value obtained by subtracting the forward power Pf from the direct-current power Pdc that is supplied to the amplifier 12 from the direct-current power supply 13, and the first controller 19 is constructed so that in cases where it is detected that the calculated loss has exceeded the loss set value Plset, control that lowers the direct-current power voltage Vdc and thus reduces the loss to the loss set value Plset is performed. If such a construction is used, there is no need to detect the current that flows through the respective semiconductor amplifier elements of the amplifier 12, or to detect the voltage that is applied to the respective semiconductor amplifier element. Accordingly, the cost of the system can be reduced. However, the present invention is not limited to cases in which the loss generated in the amplifier 12 is calculated in this manner; it would also be possible to construct the loss calculator 18 so that the loss that is generated in the semiconductor amplifier elements that constitute the amplifier 12 is detected, and to construct the first controller 19 so that in cases where it is detected that the loss calculated by the loss calculator 18 has exceeded the loss set value Plset, control that lowers the direct-current power voltage Vdc and thus reduces the calculated loss to the loss set value Plset is performed.

The loss generated in the semiconductor amplifier elements that constitute the amplifier 12 can be determined from the product of the voltage that is applied to these semiconductor amplifier elements and the current that flows through these semiconductor amplifier elements. For example, in a case where the semiconductor amplifier elements are MOSFETs, the loss that is generated in the in the semiconductor elements can be determined by installing a voltage detector and current detector that respectively detect the drain-source voltage Vds and the drain current Id, and calculating the product Vds×Id of the detected values of Vds and Id. In cases where the amplifier 12 is constructed from a plurality of semiconductor amplifier elements, the first controller 19 may be constructed so that the loss is calculated for all of the semiconductor amplifier elements, and control is performed so that the maximum loss among the calculated losses is reduced to the loss set value Plset, or the first controller 19 may be constructed so that the loss occurring in at least one semiconductor amplifier element selected from the semiconductor amplifier elements that constitute the amplifier 12 is determined, and control is performed so that this loss is reduced to the loss set value Plset.

If the actual losses generated in the semiconductor amplifier elements that constitute the amplifier 12 are thus calculated, and control that reduces the calculated loss to the loss set value Plset is performed when it is detected that the calculated loss has exceeded the loss set value Plset, protection of the semiconductor amplifier elements can be accomplished more securely.

Similarly, in the embodiment shown in FIG. 6 as well, the loss calculator 18 can be constructed so that the losses generated in the semiconductor amplifier elements that constitute the amplifier 12 are calculated.

Third Embodiment

In the embodiments, the oscillator 11 or amplifier 12 was controlled with the loss of the amplifier 12 taken as a parameter. However, it would also be possible to obtain an effect similar to that described above by controlling the oscillator 11 or amplifier 12 by a method similar to that described above using the junction temperature of the semiconductor amplifier elements FETa and FETb disposed in the amplifier of the amplifier 12 as a parameter.

Figure 16:
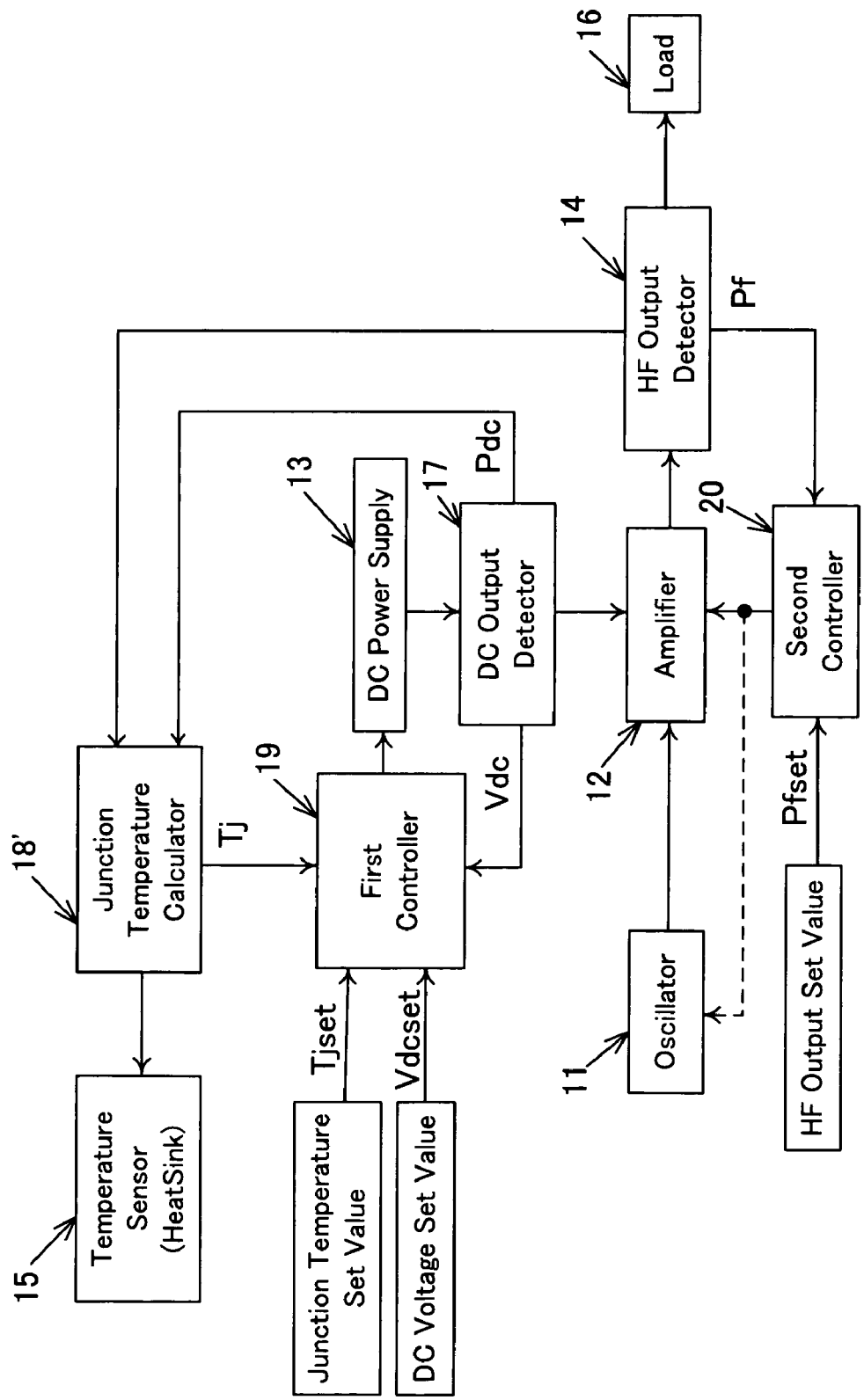
FIG. 16 is a block diagram which shows the construction of a third embodiment of the high-frequency power supply device of the present invention.

FIG. 16 is a block diagram of a third embodiment in which the output of the oscillator 11 or amplifier 12 is controlled with the junction temperature of the semiconductor amplifier elements FETa and FETb of the amplifier 12 taken as a parameter.

In the same figure, a temperature sensor 15 which detects the temperature of parts contacting the semiconductor amplifier elements that are installed in the amplifier 12 (in this example, the field effect transistors FETa and FETb) is added to the system shown in FIG. 1; furthermore, the loss calculator 18 is replaced by a junction temperature calculator 18' that calculates the junction temperature Tj of the semiconductor amplifier elements, and the loss set value Plset that is input into the first controller 19 is changed to a junction temperature set value Tjset.

Furthermore, instead of a calculated loss value Ploss, a calculated value of the junction temperature Tj of the semiconductor amplifier elements is input into the first controller 19 from the junction temperature calculator 18'.

The junction temperature calculator 18' calculates the junction temperature Tj of the semiconductor amplifier elements by means of the following equation from the heat sink temperature detected by the temperature sensor 15 (i.e., the temperature of the portion of the heat sink that is contacted by the semiconductor amplifier elements) Th [° C.], the loss Ploss1 [W] of the respective semiconductor amplifier elements installed in the amplifier 12, and the heat resistance Rjh [° C./W] between the semiconductor amplifier elements and the heat sink.

$$Tj = Th + Ploss1 \times Rjh \quad (1)$$

In cases where the heat sink is air-cooled, the junction temperature Tj of the semiconductor amplifier elements can be calculated by the following equation, where Tha is the ambient temperature of the heat sink, and Rh is the heat resistance of the heat sink.

$$Tj = Tha + Ploss1 \times Rh + Ploss1 \times Rjh \quad (2)$$

Furthermore, in cases where the heat sink is water-cooled, the junction temperature Tj of the semiconductor amplifier elements can be calculated by the following equation, where Tw is the water temperature.

$$Tj = Tw + Ploss1 \times Rh + Ploss1 \times Rjh \quad (3)$$

FETs are used as the semiconductor amplifier elements in the present embodiment; however, the junction temperature Tj of the semiconductor amplifier elements can also be calculated using the respective formulae described above in cases where other semiconductor amplifier elements such as bipolar transistors, IGBTs or the like are used.

In order to calculate the junction temperature Tj of the semiconductor amplifier elements as described above, it is necessary to determine the loss Ploss1 of the respective semiconductor amplifier elements. Methods for determining the loss Ploss1 of the respective semiconductor amplifier elements include methods in which Ploss1 is directly determined as in the method of (a) described below, and methods in which the loss Ploss1 is determined after determining the loss Ploss of the amplifier as in the methods of (b) and (c) described below.

(a) The current flowing through the semiconductor amplifier elements installed in the amplifier 12 and the voltage applied across the terminals of the semiconductor amplifier elements are multiplied and integrated, thus determining the power loss of the amplifier 12.

(b) The power loss Ploss of the amplifier 12 is determined by subtracting the high-frequency effective output power (power consumed by the load) PL (=Vout×Iout×cos θ) that is detected by the high-frequency output detector 14 from the direct-current power Pdc (=Vdc×Idc) that is detected by the direct-current output detector 17, and the loss Ploss1 per semiconductor amplifier element (mean loss) is calculated. Here, θ is the phase difference between Vout and Iout.

(c) The power loss Ploss (=Pdc−Pf+Pr) is determined by adding the reflected power Pr that returns to the power supply to the response determined by subtracting the forward power Pf that is output by the high-frequency power supply device from the direct-current power Pdc that is supplied to the amplifier 12, and the loss Ploss1 per semiconductor amplifier element (mean loss) is calculated.

Using the loss Ploss1 determined as described above, the junction temperature Tj of the respective semiconductor amplifier elements is calculated using one of the Equations (1) through (3).

Furthermore, in cases where the amplifier 12 is constructed from a plurality of semiconductor amplifier elements, and there is a danger that the junction temperatures Tj of the semiconductor amplifier elements will vary greatly according to the element, it is desirable that the power loss values for the respective semiconductor elements be determined by multiplying the current that flows through each semiconductor amplifier element and the voltage that is applied to each semiconductor amplifier element, that the junction temperature Tj for each semiconductor element be calculated separately from the loss values for the respective semiconductor elements, and that the maximum value among the calculated junction temperatures Tj be taken as the junction temperature Tj of the semiconductor amplifier elements constituting the amplifier.

Furthermore, in cases where the junction temperatures Tj of the plurality of semiconductor amplifier elements constituting the amplifier 12 vary greatly, and the semiconductor amplifier element which has the highest junction temperature Tj is known beforehand, it would also be possible to calculate the loss of this semiconductor amplifier element from the current flowing through this semiconductor amplifier element and the voltage applied to this semiconductor amplifier element, and to take the junction temperature Tj determined from this loss using any of the Equations (1) through (3) as the junction temperature Tj of the semiconductor amplifier elements of the amplifier 12.

The first controller 19 inputs the calculated junction temperature value Tj calculated by the junction temperature calculator 18', the direct-current power voltage Vdc detected by the direct-current output detector 17 and the junction temperature set value Tjset, and in cases where the calculated junction temperature value Tj that is calculated by the junction temperature calculator 18' exceeds the junction temperature set value Tjset that is set beforehand, this first controller 19 performs a control action that lowers the direct-current power voltage Vdc that is supplied to the amplifier 12 from the direct-current power supply 13 until the calculated junction temperature value Tj becomes equal to the junction temperature set value Tjset. In cases where the calculated junction temperature value Tj is equal to or less than the junction temperature set value Tjset that is supplied to the amplifier 12 from the direct-current power supply 13, this first controller 19 performs a control action that maintains the direct-current power voltage Vdc at a direct-current voltage set value Vdcset that has been set at an appropriate value.

Furthermore, as in the case of the high-frequency power supply device shown in FIG. 1, the second controller 20 inputs the high-frequency output Pf that is detected by the high-frequency output detector 14 and the high-frequency output set value Pfset, and controls the output of the oscillator 11 or amplifier 12 so that the high-frequency output that is supplied to the load 16 from the amplifier 12 is caused to approach the high-frequency output set value Pfset.

In the high-frequency power supply device shown in FIG. 16, when the calculate junction temperature value Tj of the semiconductor amplifier elements of the amplifier 12 exceeds the junction temperature set value Tjset, the first controller 19 performs a control action so that the direct-current power voltage Vdc that is supplied to the amplifier 12 from the direct-current power supply 13 is lowered, thus lowering the output of the amplifier 12 so that the loss that is generated in the semiconductor amplifier element of the amplifier 12 is reduced, and the junction temperature Tj of these semiconductor amplifier elements is lowered. In this case, the second controller 20 controls the oscillator 11 or amplifier 12 so that the high-frequency output (forward power or effective power) Pf that is supplied to the load 16 from the amplifier 12 is caused to approach the high-frequency output set value (set value of the forward power or set value of the effective power) Pfset, thus increasing the output of the amplifier 12. Accordingly, a drop in the output of the amplifier 12 is prevented. When the second controller 20 increases the output of the amplifier 12, the loss generated in the amplifier 12 increases so that the junction temperature Tj of the semiconductor amplifier elements tends to increase; however, this increase in the loss is suppressed by the first controller 19, so that the junction temperature 20 of the semiconductor amplifier elements is maintained at the junction temperature set value Tjset.

When the control performed by the first controller 19 that lowers the direct-current power voltage Vdc and maintains the junction temperature Tj of the semiconductor amplifier elements at the junction temperature set value Tjset and the control performed by the second controller 20 that increases the output of the amplifier 12 are balanced, the control operations performed by the first controller 19 and second controller 20 are stopped, and the high-frequency output Pf is stabilized.

Thus, in the third embodiment, in cases where it is detected that the calculated junction temperature value Tj of the semiconductor amplifier elements of the amplifier 12 has exceeded the junction temperature set value Tjset, a control action that lowers the direct-current power voltage Vdc and reduces the junction temperature Tj of the semiconductor amplifier elements to the junction temperature set value Tjset is performed, and at the same time, a control action that raises the high-frequency output Pf toward the high-frequency output set value Pfset is performed; accordingly, in cases where a load which is such that a large load is generated in the amplifier 12 is connected, the high-frequency power (forward power or effective power) that can be supplied to the load 16 can be increased compared to that in a conventional device while the junction temperature Tj of the semiconductor amplifier elements of he amplifier 12 is kept to the junction temperature set value Tjset.

Furthermore, the junction temperature Tj of the semiconductor amplifier elements of the amplifier 12 is normally restricted to the junction temperature set value Tjset, thus it is possible to prevent the semiconductor amplifier elements of the amplifier 12 from damage.

Furthermore, Tables 1 and 2 show simulation results obtained in a case where the permissible value of the loss of the field effect transistors FETa and FETb was set at 300 W. Here, the simulation results obtained in a case where the permissible temperature of the junction temperature of the field effect transistors FETa and FETb was set at 150° C. are also shown.

Accordingly, as is clear from Tables 1 and 2, high-frequency outputs of 330 [W], 550 [W], 410 [W], 360 [W], 234 [W] and 360 [W] can also be obtained in the third embodiment at load impedance values of 16.2−j47.3Ω, 9.7−j20Ω, 8.3Ω, 9.7+j20Ω, 16.2+j47.3Ω and 49+j101Ω. Thus, the high-frequency output can be greatly increased compared to a conventional device.

Furthermore, in the third embodiment as well, a waveform diagram similar to the simulation results shown in FIG. 4 can be obtained in a case where the drain voltage Vds and drain current Id of the field effect transistor FETa, the output voltage Vout and output current Iout of the amplifier, and the loss Vds×Id of FETa are simulated for a connected load of 9.7−j20Ω. Accordingly, in the third embodiment as well, an effect similar to that of the comparative results shown in FIGS. 4 and 5 in the first embodiment, i.e., an effect that makes it possible to achieve a great increase in the high-frequency output (Iout×Vout) compared to a conventional high-frequency power supply device, can be obtained.

Fourth Embodiment

Figure 17:
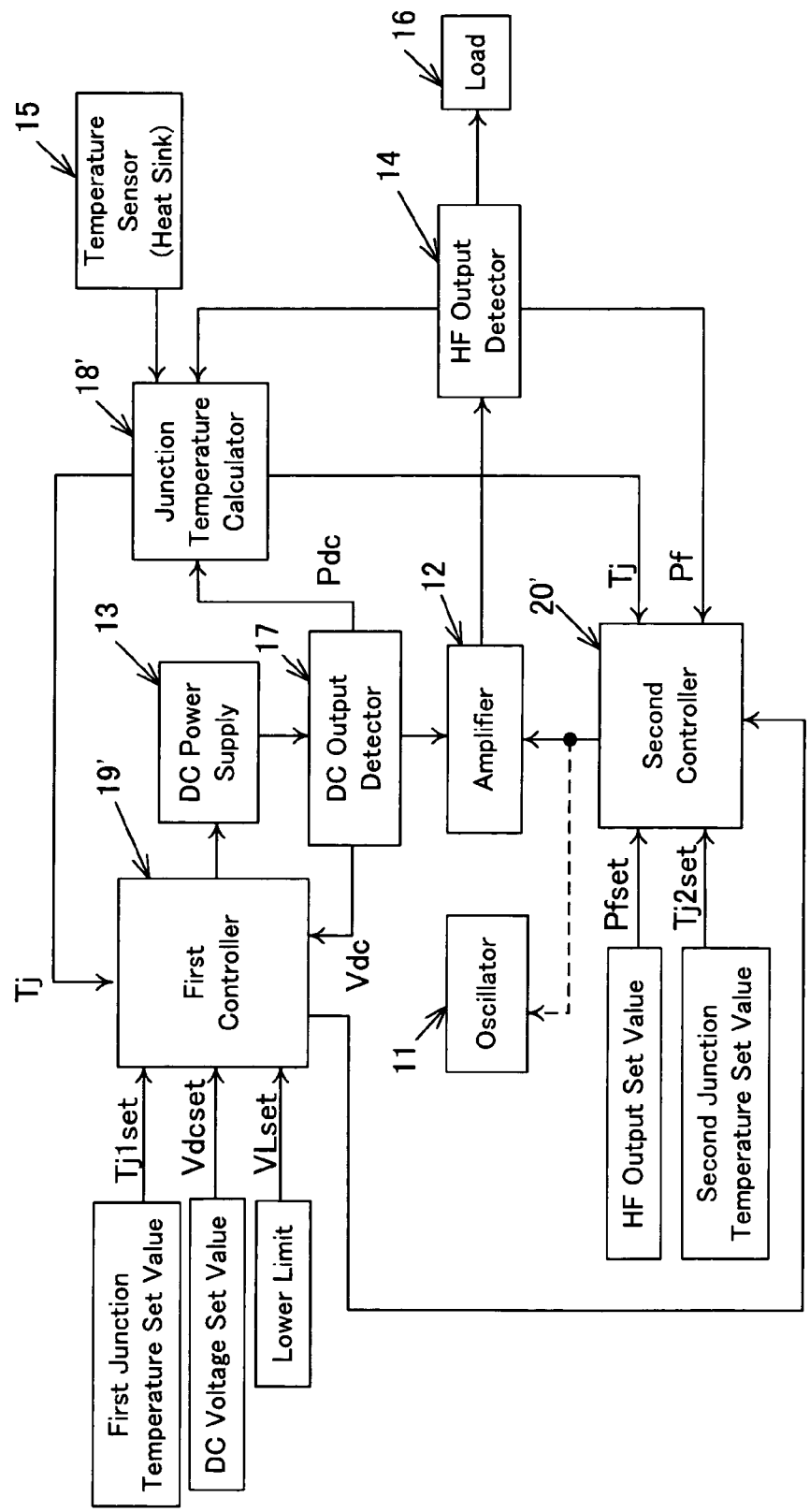
FIG. 17 is a block diagram which shows the construction of a fourth embodiment of the high-frequency power supply device of the present invention.

FIG. 17 is a block diagram of a fourth embodiment in which the output of the oscillator 11 or amplifier 12 is controlled by the same method as in the second embodiment using the junction temperature of the semiconductor amplifier elements FETa and FETb of the amplifier 12 as a parameter.

The same figure shows that, in FIG. 6a temperature sensor 15 which detects the temperature of parts contacting the semiconductor amplifier elements that are installed in the amplifier 12 (in this example, the field effect transistors FETa and FETb) is added to the system shown in FIG. 1; furthermore, the loss calculator 18 is replaced by a junction temperature calculator 18' that calculates the junction temperature Tj of the semiconductor amplifier elements, the first loss set value Plset1 that is input into the first controller 19 is changed to a first junction temperature set value Tj1set, and the second loss set value Plset2 that is input into the second controller 20 is changed to a second junction temperature set value Tj2set.

Furthermore, instead of the calculated loss value Ploss, a calculated value of the junction temperature Tj of the semiconductor amplifier elements is input into the first controller 19 and second controller 20 from the junction temperature calculator 18'.

In the high-frequency power supply device shown in FIG. 17, the first controller 19' is constructed so that in cases where the calculated junction temperature value Tj that is calculated by the junction temperature calculator is equal to or less than the first junction temperature set value Tj1set that is set beforehand, a control action that maintains the direct-current power voltage Vdc that is supplied to the amplifier 12 from the direct-current power supply 13 is maintained at a direct-current voltage set value Vdcset that is set at an appropriate value, and so that in cases where the calculated junction temperature value Tj exceeds the first junction temperature set value Tj1set, a control action that lowers the output voltage Vdc of the direct-current power supply 13 within in range that does not fall below a predetermined lower limit value VLset is performed in order to make the calculated junction temperature value Tj equal to the first junction temperature set value Tj1set.

Furthermore, the second controller 20' is constructed so that in cases where the direct-current power voltage Vdc is greater than the lower limit value VLset, the output of the oscillator 11 or amplifier 12 is controlled so that the high-frequency output Pf of the amplifier 12 that is detected by the high-frequency output detector 14 is caused to approach the high-frequency output set value Pfset, and so that in cases where the direct-current power voltage Vdc is equal to or less than the lower limit value VLset, the output of the oscillator 11 or amplifier 12 is controlled so that the calculated junction temperature value Tj is made equal to a second junction temperature set value Tj2set which is set at a value that is equal to the first junction temperature set value Tj1set or slightly greater than the first junction temperature set value Tj1set.

The first junction temperature set value Tj1set and second junction temperature set value Tj2set ($\geq$Tj1set) are set at values that are equal to or less than the maximum permissible value of the junction temperature Tj of the semiconductor amplifier elements that constitute the amplifier 12. In other respects, this embodiment is the same as the third embodiment.

In the fourth embodiment, in cases where the calculated junction temperature value Tj does not exceed the first junction temperature set value Tj1set, the first controller 19' performs a control action so that the output voltage Vdc of the direct-current power supply 13 is maintained at the direct-current voltage set value Vdcset, which is set at an appropriate value. Furthermore, in cases where the calculated junction temperature value Tj calculated by the junction temperature calculator 18' exceeds the first junction temperature set value Tj1set, the first controller 19' performs a control action so that the output voltage Vdc of the direct-current power supply 13 is lowered in a range that does not fall below the lower limit value VLset, and thus lowers the output of the amplifier 12, so that the calculated junction temperature value Tj is reduced.

In cases where the output voltage (direct-current power voltage) Vdc of the direct-current power supply 13 is greater than the lower limit value VLset, the second controller 20' controls the output of the oscillator 11 or the amplifier 12 so that the high-frequency output Pf of the amplifier 12 that is detected by the high-frequency output detector 14 is caused to approach the high-frequency output set value Pfset. On the other hand, in cases where the direct-current power voltage Vdc is equal to or less than the lower limit value VLset, the second controller 20' controls the output of the oscillator 11 or amplifier 12 so that the calculated junction temperature value Tj is made equal to the second junction temperature set value Tj2set.

Thus, in the fourth embodiment, in cases where the junction temperature Tj of the semiconductor amplifier elements exceeds the first junction temperature set value Tj1set, the first controller 19' performs a control action which lowers the output voltage Vdc of the direct-current power supply 13 within a range that does not fall below the lower limit value VLset, and thus lowers the output of the amplifier 12. Accordingly, control that keeps the junction temperature Tj of the semiconductor amplifier elements to the first junction temperature set value Tj1set can be performed without damaging the stable operation of the amplifier 12.

Furthermore, in cases where the direct-current power voltage Vdc is greater than the lower limit value VLset, the second controller 20' performs a control action so that the high-frequency output Pf is caused to approach the high-frequency output set value Pfset. Accordingly, in cases where a load 16 which is such that a large loss is generated in the amplifier 12 is connected, the high-frequency power (forward power or effective power) Pf that can be supplied to the load 16 can be increased compared to that in a conventional device, while the junction temperature Tj of the semiconductor amplifier elements is kept to the first junction temperature set value Tj1set.

Furthermore, in cases where the direct-current power voltage Vdc tends to fall below the lower limit value VLset, the second controller 20' controls the output of the oscillator 11 or amplifier 12 so that the calculated junction temperature value Tj is made equal to the second junction temperature set value Tj2set, which is set at a value that is equal to the first junction temperature set value Tj1set or slightly greater than the first junction temperature set value Tj1set, and the control of the direct-current power voltage Vdc by the first controller 19' (control that lowers the direct-current power voltage Vdc) is stopped. Accordingly, the destabilization of the operation of the amplifier 12 as a result of the output of the direct-current power supply 13 falling below the lower limit value VLset can be prevented.

The circuit constructions shown in the FIGS. 7 through 10 can also be used as the concrete circuit construction of the direct-current power supply 13 in the third and fourth embodiments.

Furthermore, the circuit construction shown in FIG. 11 can also be used as the concrete circuit construction of the first controller 19' in the fourth embodiment.

Figure 18:
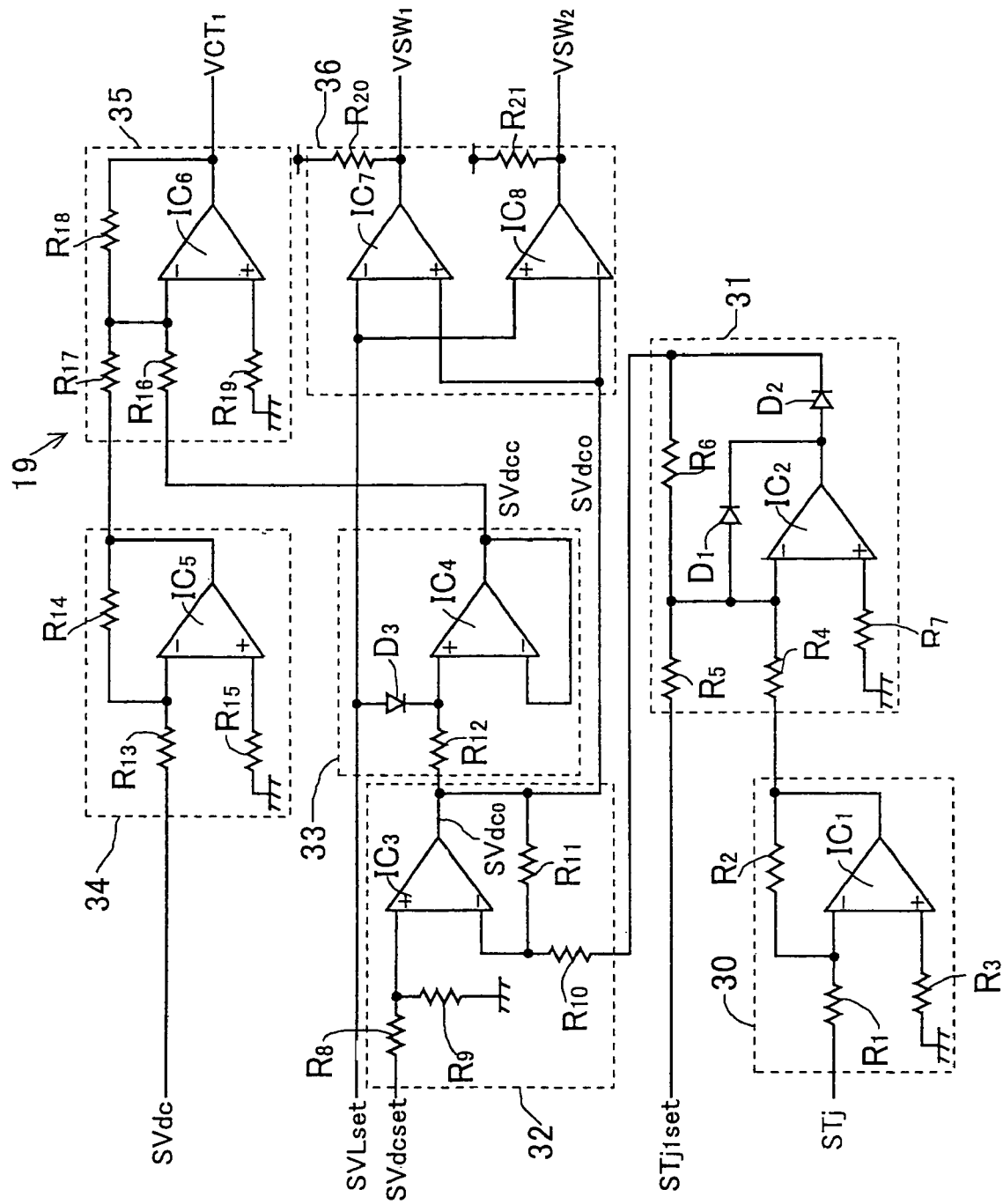
FIG. 18 is a circuit diagram which shows the circuit construction in a case where the first controller of the high-frequency power supply device of the fourth embodiment is realized by means of a hardware circuit.

FIG. 18 is a circuit diagram which shows the circuit construction used in a case where the first controller 19' in the fourth embodiment is realized by means of a hardware circuit. This circuit construction differs from the circuit construction shown in FIG. 11 in that a first junction temperature set signal (voltage signal) STj1set that gives the first junction temperature set value Tj1set is input instead of the first loss set signal SPlset1 that is input into the first error amplifier circuit 31, and in that a calculated junction temperature value signal STj that gives a junction temperature set value Tj calculated by the junction temperature calculator 18' is input instead of the loss calculation signal SPloss that is input into the polarity reversing circuit 30.

Figure 19:
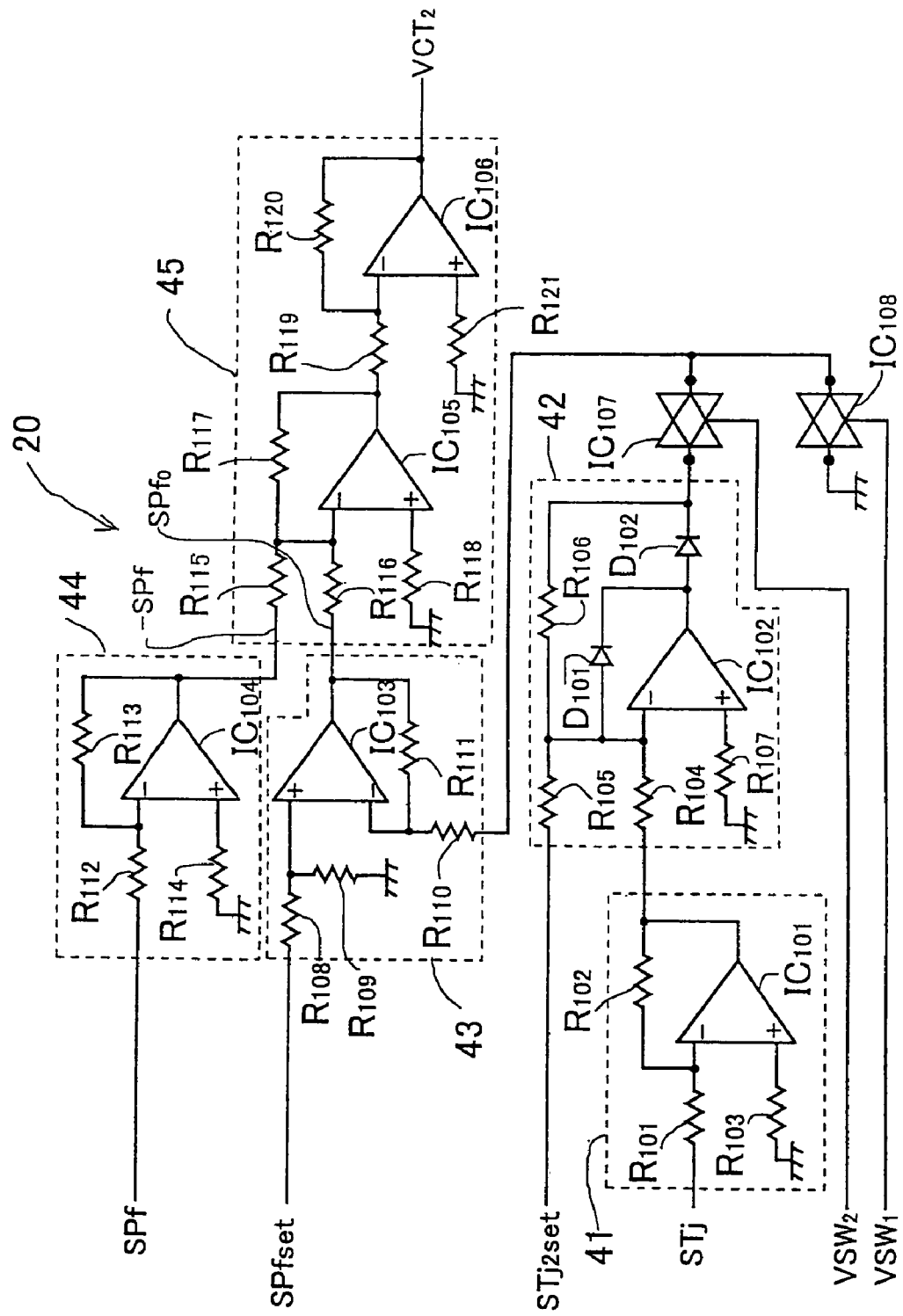
FIG. 19 is a circuit diagram which shows the circuit construction in a case where the second controller of the high-frequency power supply device of the fourth embodiment is realized by means of a hardware circuit.

Furthermore, the circuit construction shown in FIG. 19 can be used as the concrete circuit construction of the second controller 20' in the fourth embodiment.

FIG. 19 is a circuit diagram which shows the circuit construction used in a cases where the second controller 20' in the fourth embodiment is realized by means of a hardware circuit. This circuit construction differs from the circuit construction shown in FIG. 12 in that a second junction temperature set signal (voltage signal) STj2set that gives the second junction temperature set value Tj2set is input instead of the second loss set signal SPlset2 that is input into the error amplifier circuit 42, and in that a calculated junction temperature value signal STj that gives the calculated junction temperature value Tj that is calculated by the junction temperature calculator 18' is input instead of the loss calculation signal SPloss that is input into the polarity reversing circuit 41.

The operations of the circuit constructions shown in FIGS. 18 and 19 are operations in which the first loss set signal SPlset1, second loss set signal SPlset2 and loss calculation signal SPloss in the explanation of the operation in section (4) concerning a case in which the first and second controllers 19' and 20' were constructed as shown in FIGS. 11 and 12 are respectively changed to the first junction temperature set signal STj1set, second junction temperature set signal STj2set and calculated junction temperature value signal STj; accordingly, a description of these operations is omitted here.

Furthermore, in regard to the concrete circuit construction of the first controller 19 in the third embodiment, this controller can be constructed using a circuit in which the comparator circuit 36 is removed from the circuit shown in FIG. 18. Furthermore, in regard to the concrete construction of the second controller 20 in the third embodiment, this circuit can be constructed from the target high-frequency output signal generating circuit 43, polarity reversing circuit 44 and differential amplifier 45 shown in FIG. 19.

In cases where the first controller 19' in the fourth embodiment is constructed in terms of software, the flow chart shown in FIG. 14 can be applied.

Figure 20:
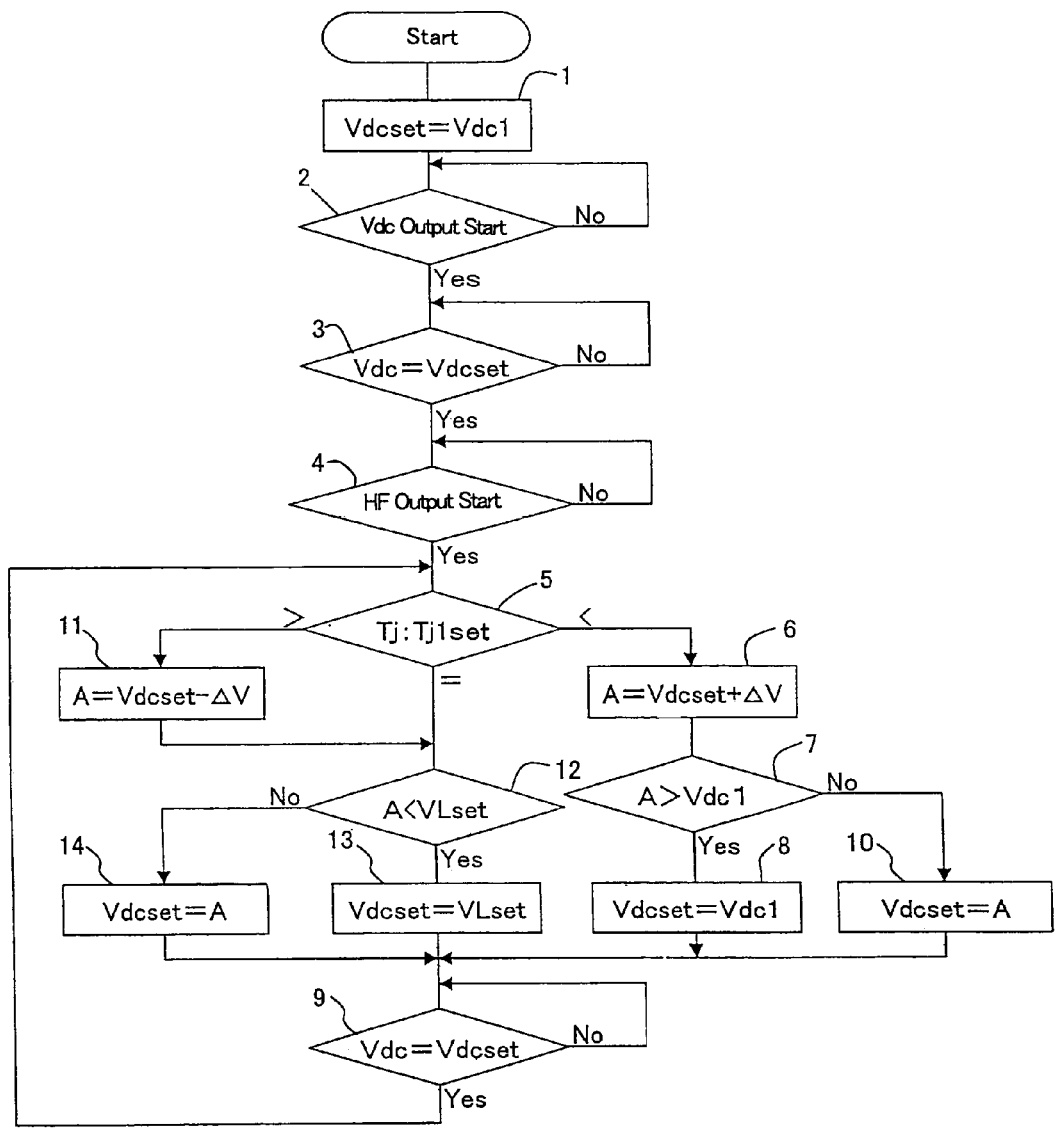
FIG. 20 is a flow chart showing the algorithms of a program used to cause execution by a computer in a case where the first controller of the high-frequency power supply device of the fourth embodiment is realized by means of software.

FIG. 20 is a flow chart which shows the algorithm of a program that is executed in a computer in cases where the first controller of the high-frequency power supply device of the fourth embodiment is realized in terms of software. This flow chart differs from the flow chart shown in FIG. 14 only in that the comparative judgement processing of the calculated loss value Ploss and first loss set value Plset1 in step 5 is changed to comparative judgement processing of the calculated junction temperature value Tj and first junction temperature set value Tj1set.

The content of the processing in the flow chart shown in FIG. 20 is a content in which the processing of step 5 in the processing content of the flow chart shown in FIG. 14 in the section titled "(6) Other Example of Construction of First Control Part 19'" is changed to comparative judgement processing of the calculated junction temperature value Tj and first junction temperature set value Tj1set. Accordingly, a description of this operation is omitted here.

Furthermore, in cases where the second controller 20' in the fourth embodiment is constructed in terms of software, the flow chart shown in FIG. 15 can be applied.

Figure 21:
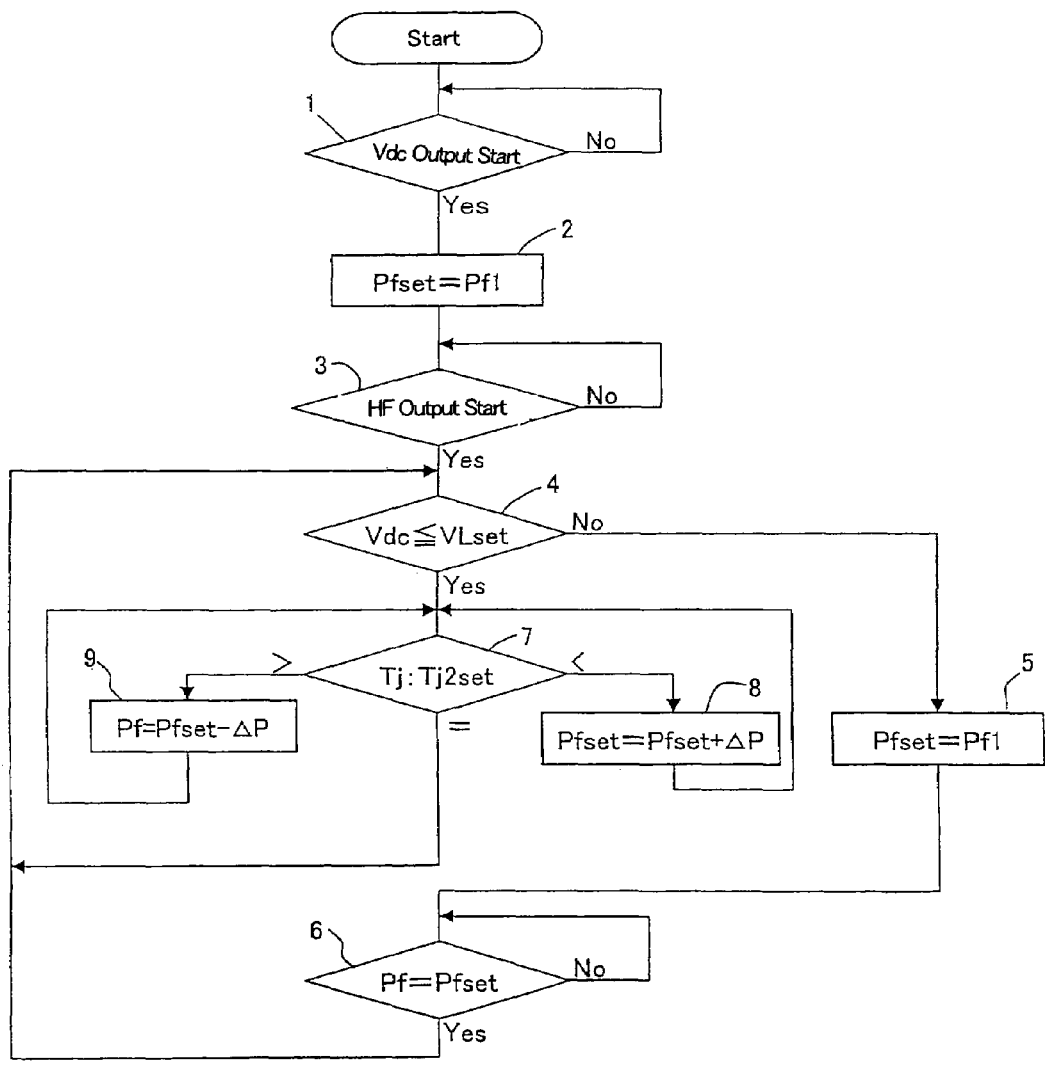
FIG. 21 is a flow chart showing the algorithms of a program used to cause execution by a computer in a case where the second controller of the high-frequency power supply device of the fourth embodiment is realized by means of software.

FIG. 21 is a flow chart showing the algorithm of a program that is executed in a computer in cases where the second controller of the high-frequency power supply device of the fourth embodiment is realized in terms of software. This flow chart differs from the flow chart shown in FIG. 15 only in that the comparative judgement processing of the calculated loss value Ploss and second loss set value Plset2 in step 7 is changed to the comparative judgement processing of the calculated junction temperature value Tj and second junction temperature set value Tj2set.

The content of the processing in the flow chart shown in FIG. 21 is the same as the content of the processing in the flow chart shown in FIG. 15, referred in connection with Section (7): Other Example of Construction of Second Controller 20', except that the processing of step 7 is replaced by the comparative judgment processing between the calculated junction temperature value Tj and the second junction temperature set value Tj2set. Accordingly, a description of this operation is omitted here.

TABLE 1

| Vdc [V] | Reflection Coefficient of Load | | Load Impedance | Forward Power [W] | Reflected Power [W] | FET Loss [W] | Ambient Temperature [° C.] | Heat Sink Temperature of FET Contact Surface [° C.] | FET Junction Temperature [° C.] |
|---|---|---|---|---|---|---|---|---|---|
| | Magnitude | Phase [degrees] | | | | | | | |
| 200 | 0.714 | 0 | 300 | 420 | 210 | 210 | 45 | 76.5 | 118.5 |
| 200 | 0.714 | −45 | 49 − j101 | 480 | 240 | 230 | 45 | 79.5 | 125.5 |
| 150 | 0.714 | −90 | 16.2 − j47.3 | 330 | 165 | 300 | 45 | 90 | 150 |
| 110 | 0.714 | −135 | 9.7 − j20 | 550 | 275 | 300 | 45 | 90 | 150 |
| 100 | 0.714 | −180 | 8.3 | 410 | 205 | 300 | 45 | 90 | 150 |
| 110 | 0.714 | −225 | 9.7 + j20 | 360 | 180 | 300 | 45 | 90 | 150 |
| 150 | 0.714 | −270 | 16.2 + j47.3 | 234 | 117 | 300 | 45 | 90 | 150 |
| 180 | 0.714 | −315 | 49 + j101 | 360 | 180 | 300 | 45 | 90 | 150 |

TABLE 2

| Vdc [V] | Reflection Coefficient of Load | | Load Impedance | Forward Power [W] | Reflected Power [W] | FET Loss [W] | Ambient Temperature [° C.] | Heat Sink Temperature of FET Contact Surface [° C.] | FET Junction Temperature [° C.] |
|---|---|---|---|---|---|---|---|---|---|
| | Magnitude | Phase [degrees] | | | | | | | |
| 200 | 0.714 | 0 | 300 | 420 | 210 | 210 | 45 | 76.5 | 118.5 |
| 200 | 0.714 | −45 | 49 − j101 | 480 | 240 | 230 | 45 | 79.5 | 125.5 |
| 200 | 0.714 | −90 | 16.2 − j47.3 | 130 | 65 | 300 | 45 | 90 | 150 |
| 200 | 0.714 | −135 | 9.7 − j20 | 65 | 33 | 300 | 45 | 90 | 150 |
| 200 | 0.714 | −180 | 8.3 | 45 | 23 | 300 | 45 | 90 | 150 |
| 200 | 0.714 | −225 | 9.7 + j20 | 52 | 26 | 300 | 45 | 90 | 150 |
| 200 | 0.714 | −270 | 16.2 + j47.3 | 86 | 43 | 300 | 45 | 90 | 150 |
| 200 | 0.714 | −315 | 49 + j101 | 240 | 120 | 300 | 45 | 90 | 150 |

The invention claimed is:

1. A high-frequency power supply device including an oscillator to output a high-frequency signal, an amplifier to amplify the output of the oscillator for supplying a high-frequency output to a load, and a direct-current power supply to supply a direct-current power voltage to the amplifier, the high-frequency power supply device comprising:

a direct-current output detector connected between the direct-current power supply and the amplifier to detect at least the direct-current power voltage supplied from the direct-current power supply to the amplifier;
a high-frequency output detector connected between the amplifier and the load to detect the high-frequency output supplied from the amplifier to the load;
a loss calculator that calculates a loss generated in the amplifier;
a first controller which, when the calculated loss by the loss calculator exceeds a loss set value determined beforehand, causes the direct-current power supply to lower the direct-current power voltage supplied to the amplifier from the direct-current power supply until the calculated loss becomes equal to the loss set value, the first controller further causing, when the calculated loss is no greater than the loss set value, the direct-current power supply to maintain the direct-current power voltage supplied to the amplifier from the direct-current power supply at an appropriate direct-current voltage set value; and
a second controller which controls the output of the oscillator or the amplifier so that the high-frequency output supplied to the load from the amplifier approaches a high-frequency output set value.

2. The high-frequency power supply device according to claim 1, wherein the loss set value is set to be no greater than a permissible maximum loss generated in the amplifier when heat generated in the amplifier reaches an upper limit of a permissible range.

3. The high-frequency power supply device according to claim 1, wherein the loss calculator calculates loss that is generated in a semiconductor element constituting the amplifier.

4. The high-frequency power supply device according to claim 3, wherein the loss set value is set to be no greater than a permissible maximum loss generated in the semiconductor element constituting the amplifier when heat generated in the semiconductor element reaches an upper limit of a permissible range.

5. The high-frequency power supply device according to claim 1, wherein the first controller causes, when the calculated loss by the loss calculator exceeds a first loss set value determined beforehand, the output voltage of the direct-current power supply to be lowered within a range that does not fall below a predetermined lower limit value in order to make the calculated loss equal to the first loss set value, the first controller further causing, when the calculated loss is no greater than the first loss set value, the direct-current power voltage supplied to the amplifier from the direct-current power supply to be maintained at an appropriate direct-current voltage set value,
wherein the second controller controls, when the direct-current power voltage is greater than the lower limit value, the output of the oscillator or the amplifier so that the high-frequency output supplied to the load from the amplifier approaches a high-frequency output set value, the second controller further controlling, when the direct-current power voltage is no greater than the lower limit value, the output of the oscillator or the amplifier in order to make the calculated loss equal to the first loss set value or to a second loss set value which is slightly greater than the first loss set value.

6. The high-frequency power supply device according to claim 5, wherein the first loss set value and the second loss set value are no greater than a permissible maximum loss generated in the amplifier when heat generated in the amplifier reaches an upper limit of a permissible range.

7. The high-frequency power supply device according to claim 5, wherein the loss calculator calculates loss generated in a semiconductor element constituting the amplifier.

8. The high-frequency power supply device according to claim 7, wherein the first loss set value and the second loss set value are no greater than a permissible maximum loss generated in the semiconductor element constituting the amplifier when heat generated in the semiconductor element reaches an upper limit of a permissible range.

9. A high-frequency power supply device including an oscillator to output a high-frequency signal, an amplifier to amplify an output of the oscillator for supplying a high-frequency output to a load, and a direct-current power supply to supply a direct-current power voltage to the amplifier, the high-frequency power supply device comprising:
a junction temperature calculator that calculates junction temperature of a semiconductor amplifier element provided in the amplifier;
a first controller which causes, when the calculated junction temperature by the junction temperature calculator exceeds a junction temperature set value determined beforehand, the direct-current power supply to lower the direct-current power voltage supplied to the amplifier from the direct-current power supply until the calculated junction temperature becomes equal to the junction temperature set value, the first controller further causing, when the calculated junction temperature is no greater than the junction temperature set value, the direct-current power supply to maintain the direct-current power voltage supplied to the amplifier from the direct-current power supply at an appropriate direct-current voltage set value; and
a second controller which controls the output of the oscillator or the amplifier so that the high-frequency output supplied to the load from the amplifier approaches a high-frequency output set value.

10. The high-frequency power supply device according to claim 9, wherein the junction temperature set value is set to be no greater than a permissible maximum value of the junction temperature of the semiconductor amplifier element.

11. The high-frequency power supply device according to claim 9, wherein the first controller causes, when the calculated junction temperature by the junction temperature calculator exceeds a first junction temperature set value determined beforehand, the output voltage of the direct-current power supply to be lowered within a range that does not fall below a predetermined lower limit value in order to make the calculated junction temperature equal to the first junction temperature set value, the first controller further causing, when the calculated junction temperature is no greater than the first junction temperature set value, the direct-current power voltage supplied to the amplifier from the direct-current power supply to be maintained at an appropriate direct-current voltage set value,
wherein the second controller controls, when the direct-current power voltage is greater than the lower limit value, the output of the oscillator or the amplifier so that the high-frequency output supplied to the load from the amplifier approaches a high-frequency output set value, the second controller further controlling, when the direct-current power voltage is no greater than the lower limit value, the output of the oscillator or the amplifier in order to make the calculated junction temperature equal to the first junction temperature set value or to a second junction temperature set value which is slightly higher than the first junction temperature set value.

12. The high-frequency power supply device according to claim 11, wherein the first junction temperature set value and the second junction temperature set value are set to be no greater than the permissible maximum value of the junction temperature of the semiconductor amplifier element.

13. The high-frequency power supply device according to claim 1, wherein the direct-current voltage set value is set at a value that maximizes efficiency of the amplifier within a range that causes no distortion of a waveform of the high-frequency output.

14. The high-frequency power supply device according to claim 9, wherein the direct-current voltage set value is set at a value that maximizes efficiency of the amplifier within a range that causes no distortion of a waveform of the high-frequency output.

15. A high-frequency power supply device including an oscillator to output a high-frequency signal, an amplifier to amplify an output of the oscillator for supplying a high-frequency output to a load, and a direct-current power supply to supply a direct-current power voltage to the amplifier, the high-frequency power supply device comprising:

a direct-current output detector connected between the direct-current power supply and the amplifier to detect at least the direct-current power voltage supplied from the direct-current power supply to the amplifier;

a high-frequency output detector connected between the amplifier and the load to detect the high-frequency output supplied from the amplifier to the load;

a junction temperature calculator that calculates junction temperature of a semiconductor amplifier element provided in the amplifier;

a first controller which causes, when the calculated junction temperature by the junction temperature calculator exceeds a junction temperature set value determined beforehand, the direct-current power supply to lower the direct-current power voltage supplied to the amplifier from the direct-current power supply until the calculated junction temperature becomes equal to the junction temperature set value, the first controller further causing, when the calculated junction temperature is no greater than the junction temperature set value, the direct-current power supply to maintain the direct-current power voltage supplied to the amplifier from the direct-current power supply at an appropriate direct-current voltage set value; and a second controller connected to the high-frequency output detector and the amplifier to control the output of the oscillator or the amplifier so that the high-frequency output supplied to the load from the amplifier approaches a high-frequency output supplied to the load from the amplifier approaches a high-frequency output set value.

* * * * *